US008054471B2

(12) United States Patent
Sciammarella

(10) Patent No.: US 8,054,471 B2
(45) Date of Patent: Nov. 8, 2011

(54) SYSTEM AND METHOD FOR ANALYZING DISPLACEMENTS AND CONTOURING OF SURFACES

(76) Inventor: Cesar A. Sciammarella, Chicago, IL (US)

( * ) Notice: Subject to any disclaimer, the term of this patent is extended or adjusted under 35 U.S.C. 154(b) by 1092 days.

(21) Appl. No.: 11/900,259

(22) Filed: Sep. 11, 2007

(65) Prior Publication Data

US 2008/0075328 A1 Mar. 27, 2008

Related U.S. Application Data

(60) Provisional application No. 60/844,778, filed on Sep. 15, 2006.

(51) Int. Cl.
*G01B 11/24* (2006.01)

(52) U.S. Cl. ............ 356/605; 356/237.1; 356/604; 356/613; 356/625; 356/237.5; 250/208.1; 701/34

(58) Field of Classification Search ..... 356/237.1–237.5, 356/604, 605, 239.4, 625, 613; 701/34; 250/208
See application file for complete search history.

(56) References Cited

U.S. PATENT DOCUMENTS

| | | | |
|---|---|---|---|
| 3,503,690 A | | 3/1970 | Sciammeralla |
| 3,860,346 A | | 1/1975 | Kersch et al. |
| 3,985,444 A | | 10/1976 | Takashima et al. |
| 4,436,419 A | | 3/1984 | Stetson et al. |
| 4,591,996 A | | 5/1986 | Vachon |
| 4,722,600 A | | 2/1988 | Chiang |
| 4,794,550 A | | 12/1988 | Greivenkamp, Jr. |
| 4,850,693 A | | 7/1989 | Deason et al. |
| 4,871,256 A | * | 10/1989 | Grindon ............ 356/610 |
| 5,020,904 A | | 6/1991 | McMahan, Jr. |
| 5,085,502 A | * | 2/1992 | Womack et al. ............ 356/605 |
| 5,135,308 A | * | 8/1992 | Kuchel ............ 356/604 |
| 5,953,448 A | * | 9/1999 | Liang ............ 382/154 |
| 6,031,612 A | * | 2/2000 | Shirley ............ 356/511 |
| 6,798,527 B2 | * | 9/2004 | Fukumoto et al. ............ 356/602 |
| 2001/0030744 A1 | * | 10/2001 | Chang ............ 356/237.3 |
| 2007/0146727 A1 | * | 6/2007 | Coulombe et al. ............ 356/604 |

OTHER PUBLICATIONS

C.A. Sciammarella, L. Lamberti, and D. Posa, "Techniques to analyze displacements and contouring of surfaces". Proc. 2007 SEM. (2006).

C.A. Sciammarella and T. Kim, "Frequency modulation interpretation of fringes and computation of strains", Experimental Mechanics 45, 393-403 (2005).

(Continued)

*Primary Examiner* — Tarifur Chowdhury
*Assistant Examiner* — Isiaka Akanbi
(74) *Attorney, Agent, or Firm* — Law Offices of Michael M. Ahmadshahi

(57) ABSTRACT

An optical system including a signal processing unit has been developed to study the contours of objects and/or their deformations. The optical system utilizes projectors comprising an illumination source including those outside the visible range and an observation source such as a digital camera. The optical system provides information regarding the object in such a way that renders a complete description of the surface geometry and/or its deformation. The optical system further facilitates a substantial simplification in obtaining the desired result in the form of eliminating the need for point-wise solution of simultaneous equations. The signal processing unit comprises software that, among others, provides a transformation that mimics projection and observation from infinity. The signal processing unit further reduces data processing by recognizing known geometric shapes, and automatically correcting for discontinuities of the object and/or optical system.

23 Claims, 22 Drawing Sheets

Photogrammetry arrangement with one projector and one camera to obtain the contouring of the surface.

OTHER PUBLICATIONS

C.A. Sciammarella, L. Lamberti and F.M. Sciammarella, "High accuracy contouring using projection moiré", Optical Engineering 44, Paper No. 093605 (12 pages) (2005).

W. Schreiber and G. Notni. "Theory and arrangements of self-calibrating whole-body three-dimensional measurement systems using fringe projection technique", Opt. Eng. (2000).

C. Reich, R. Ritter and J. Thesing, "shape measurement of complex objects by combining photogrammetry and fringe projection", Optical Engineering 39, 224-231 (2000).

L. Pirodda, "Principi e applicazioni di un metodo fotogrammetrico basato sull'impiego del moiré", Rivista Italiana di Ingegneria 12, 1-12 (1969).

R. Weller and B.M. Sheffard, "Displacement measurement by mechanical interferometry". Proceedings of the Society of Experimental Stress Analysis 6, 35-38 (1948).

P. Dantu, "Détermination expérimentale des flexions dans une plaque plane", Annales des Ponts et Chaussées 1-40, 272-344 (1940).

* cited by examiner

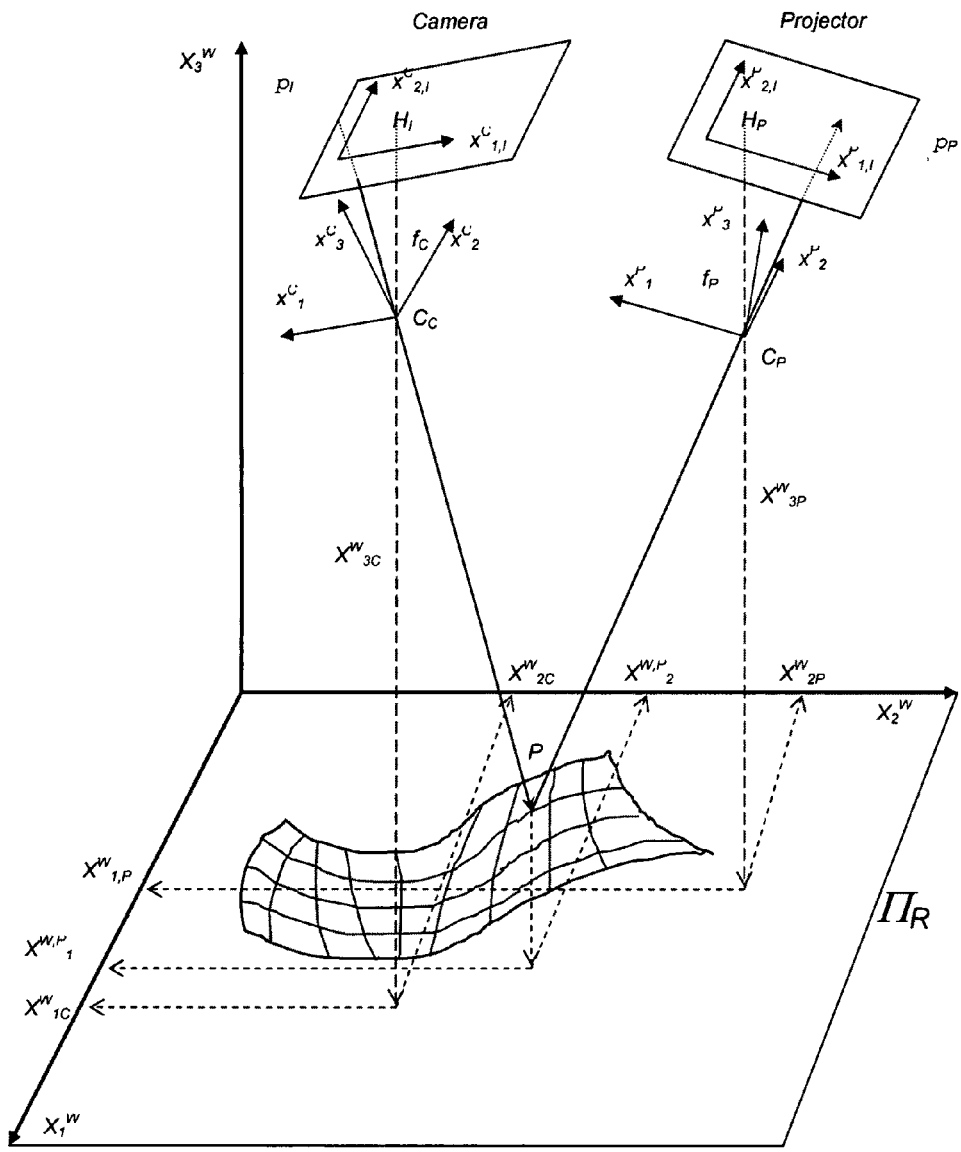
*FIG. 1. Photogrammetry arrangement with one projector and one camera to obtain the contouring of the surface.*

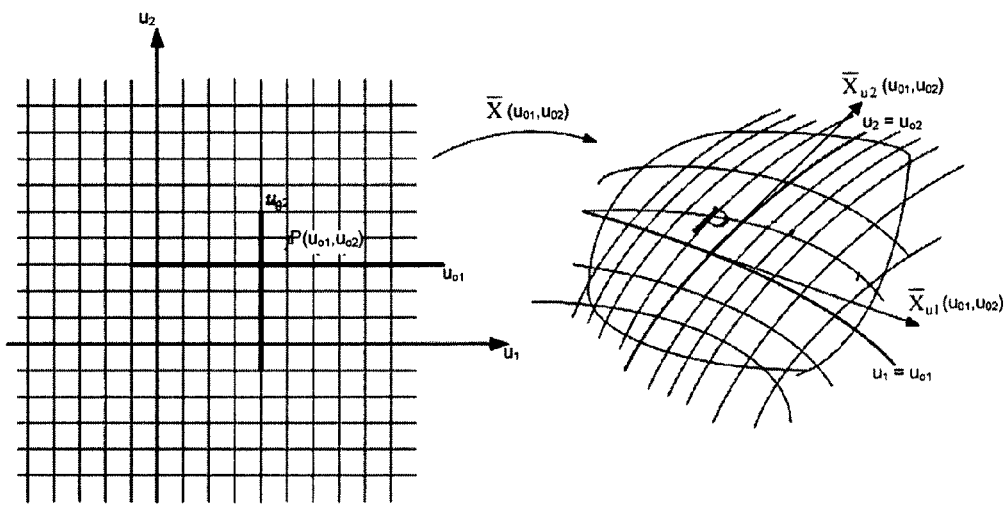
*FIG. 2. Description of 3D surface geometry by combining two systems of orthogonal lines.*

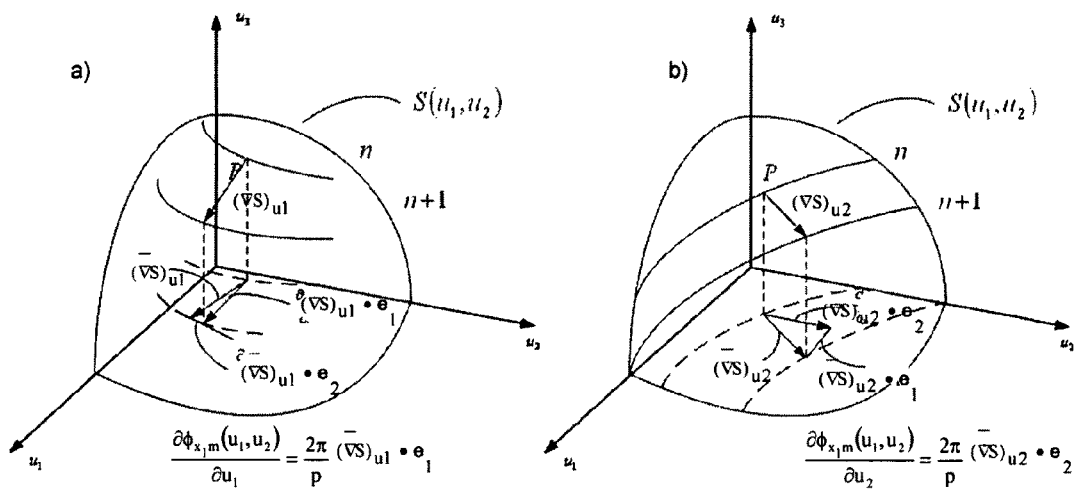
*FIG. 3. Explanation of 2-D mapping for converting 2-D fringe patterns into a 3-D surface.*

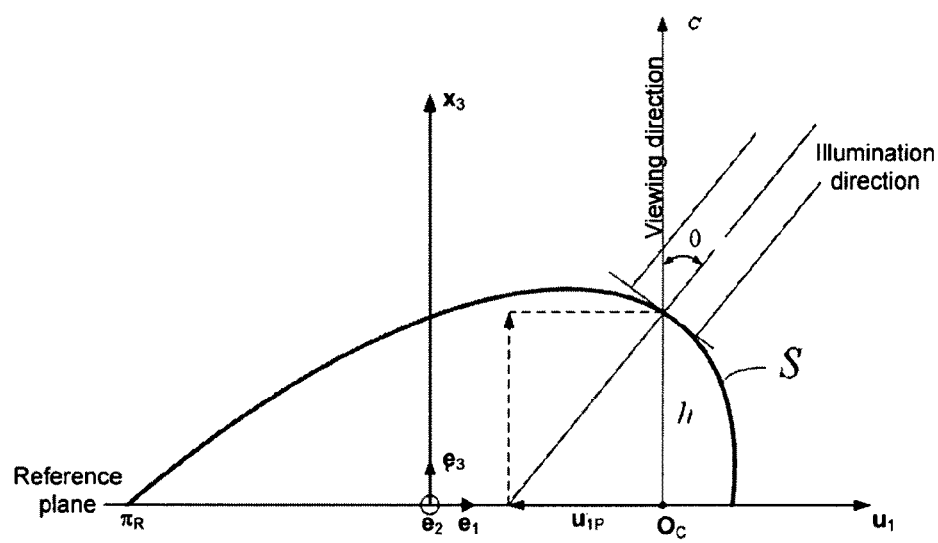
*FIG. 4. Surface cross section in a plane orthogonal to $u_2$ (see Fig. 3b). Projection and viewing are from infinity.*

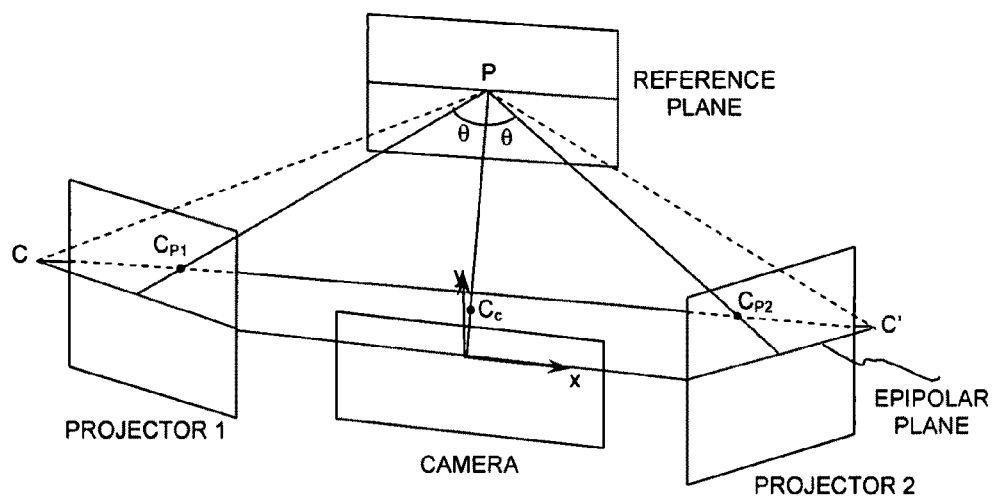
*FIG. 5. Stereo configuration where the epipolar lines are parallel in the image plane to coordinate axis.*

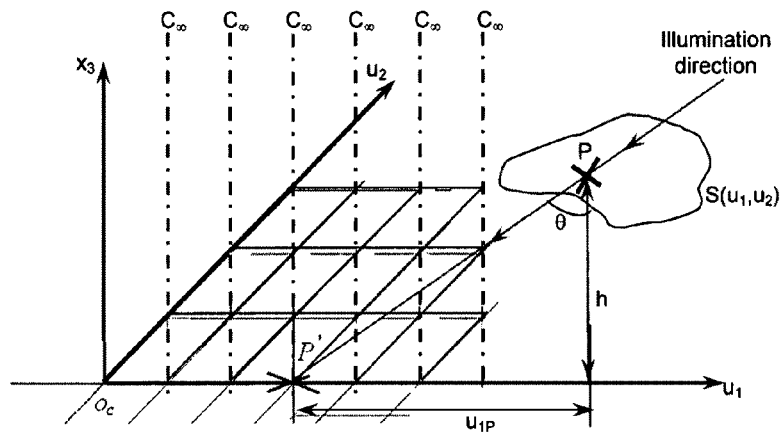
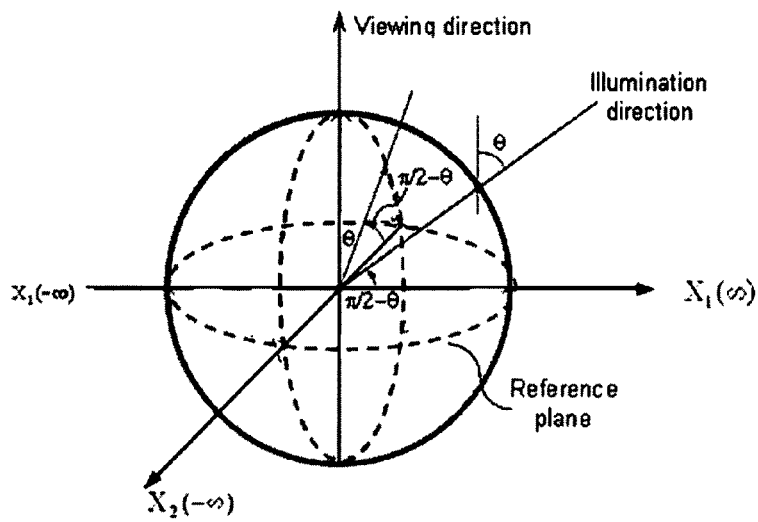
*FIG. 6. Schematic of epipolar lines and unit sphere in case of viewing and projection from infinity.*

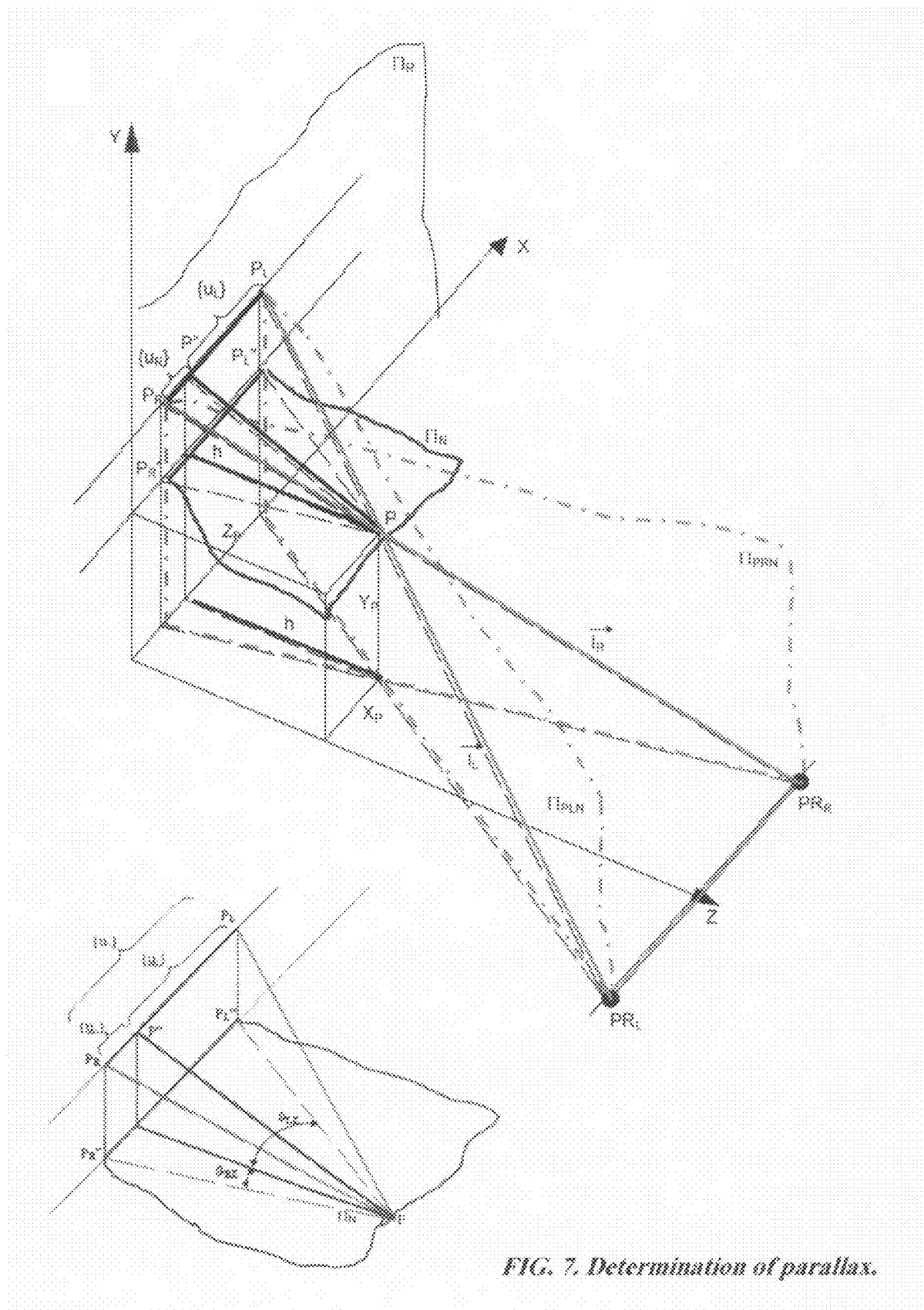
*FIG. 7. Determination of parallax.*

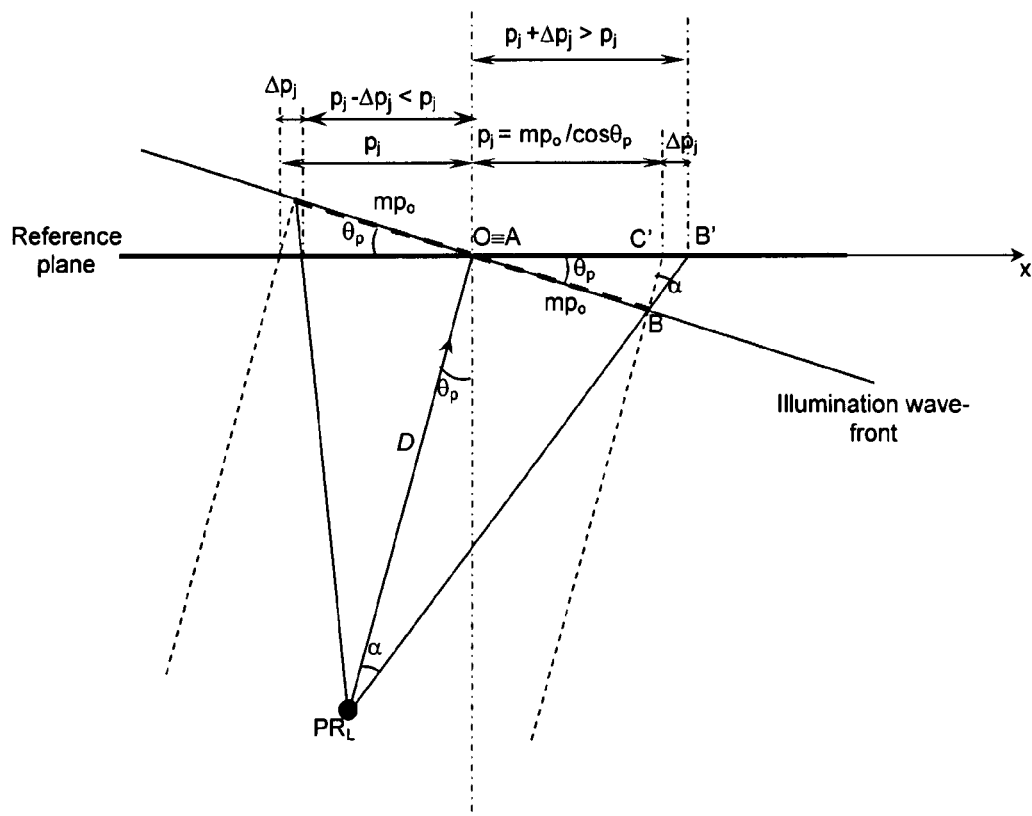
FIG. 8. *Effect of beam divergence on the projected pitch size.*

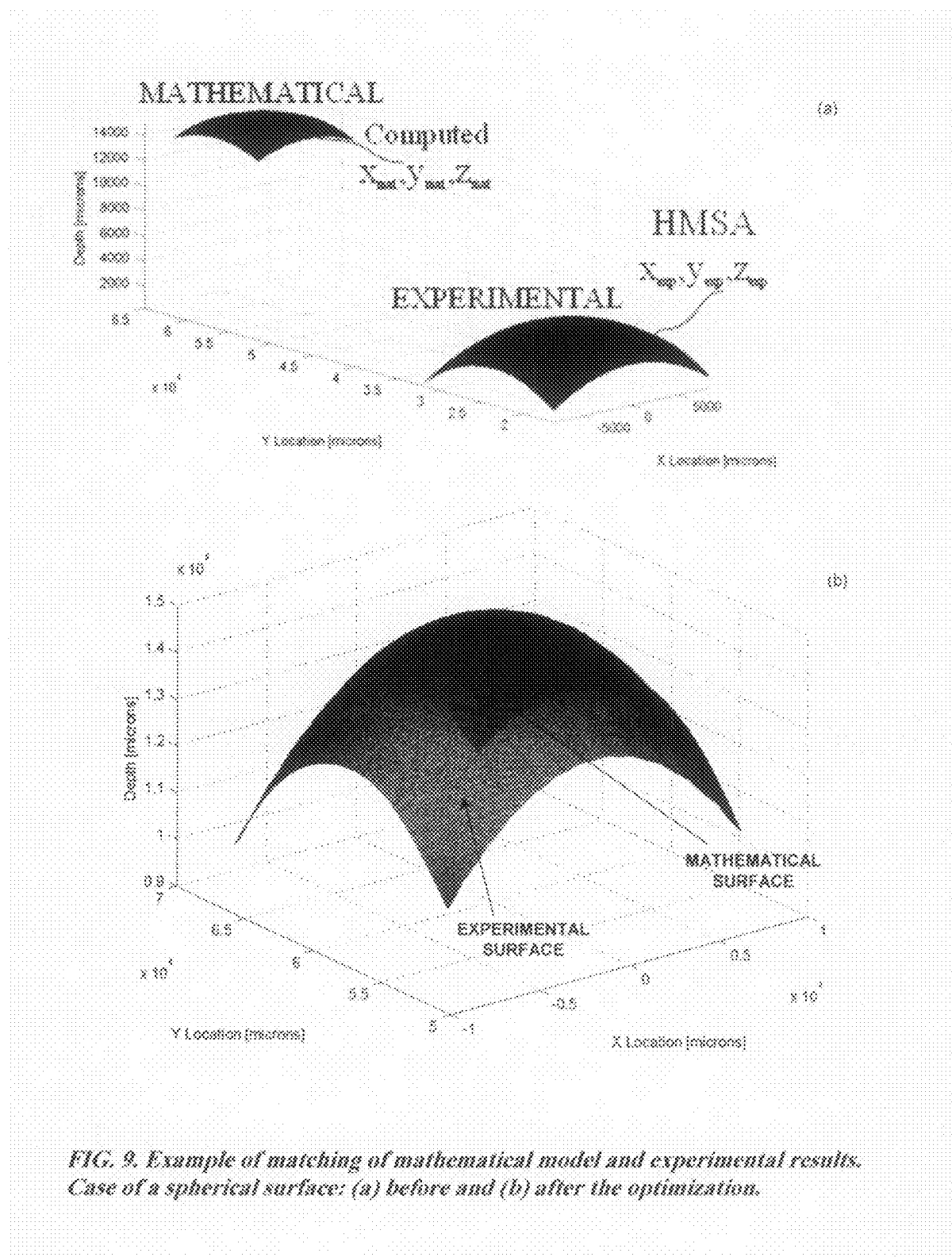
FIG. 9. Example of matching of mathematical model and experimental results. Case of a spherical surface: (a) before and (b) after the optimization.

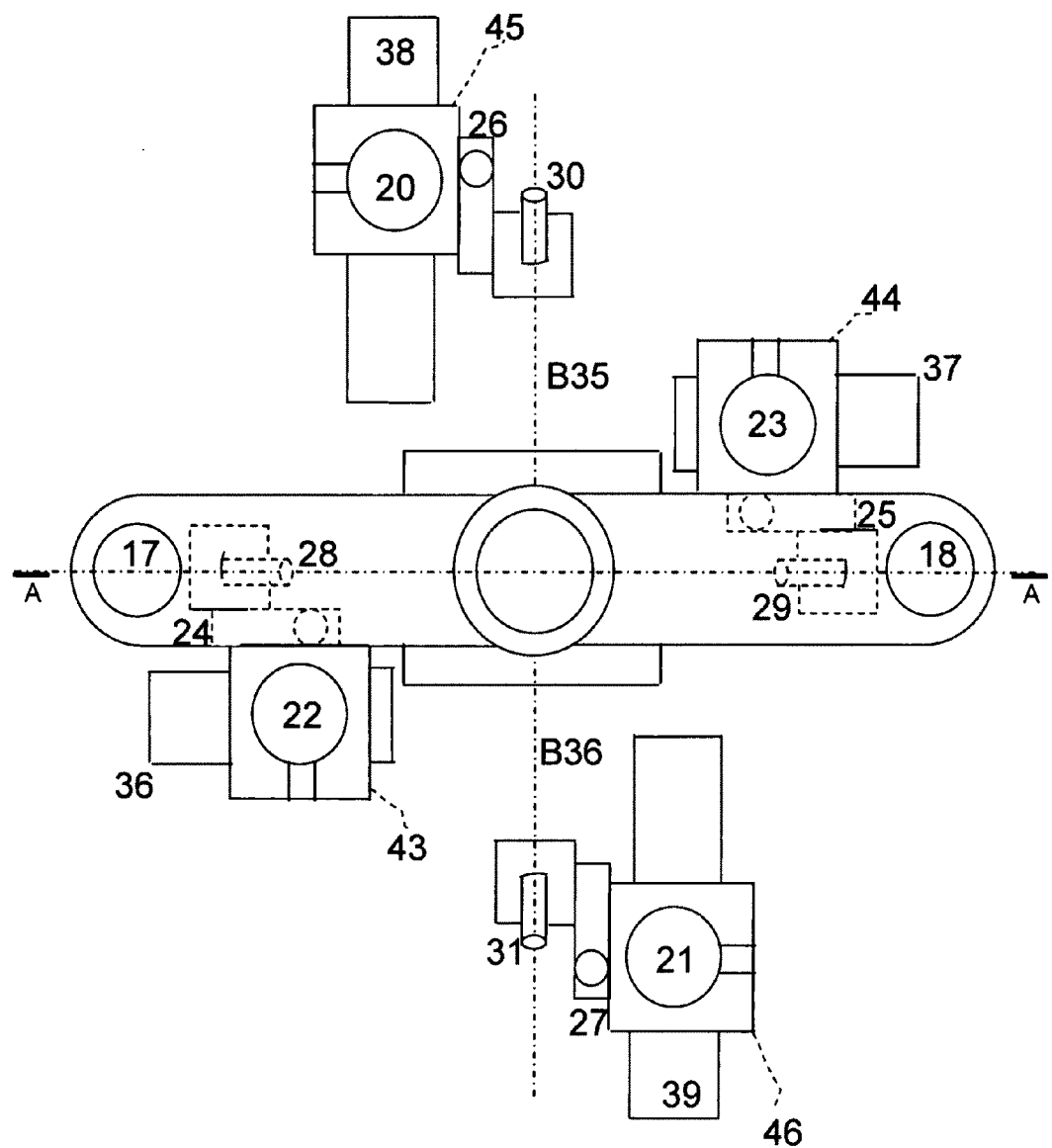
FIG. 11. Top view

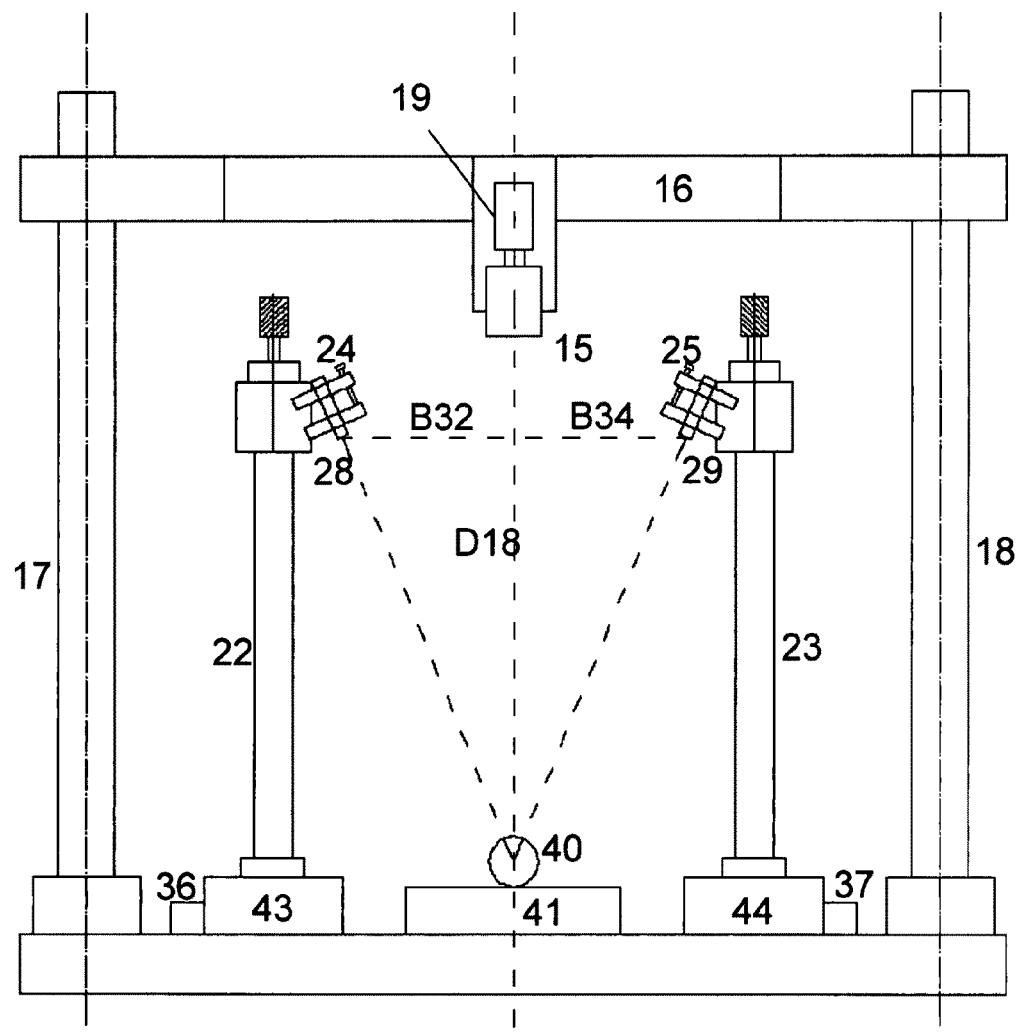
FIG 11. Side view A-A

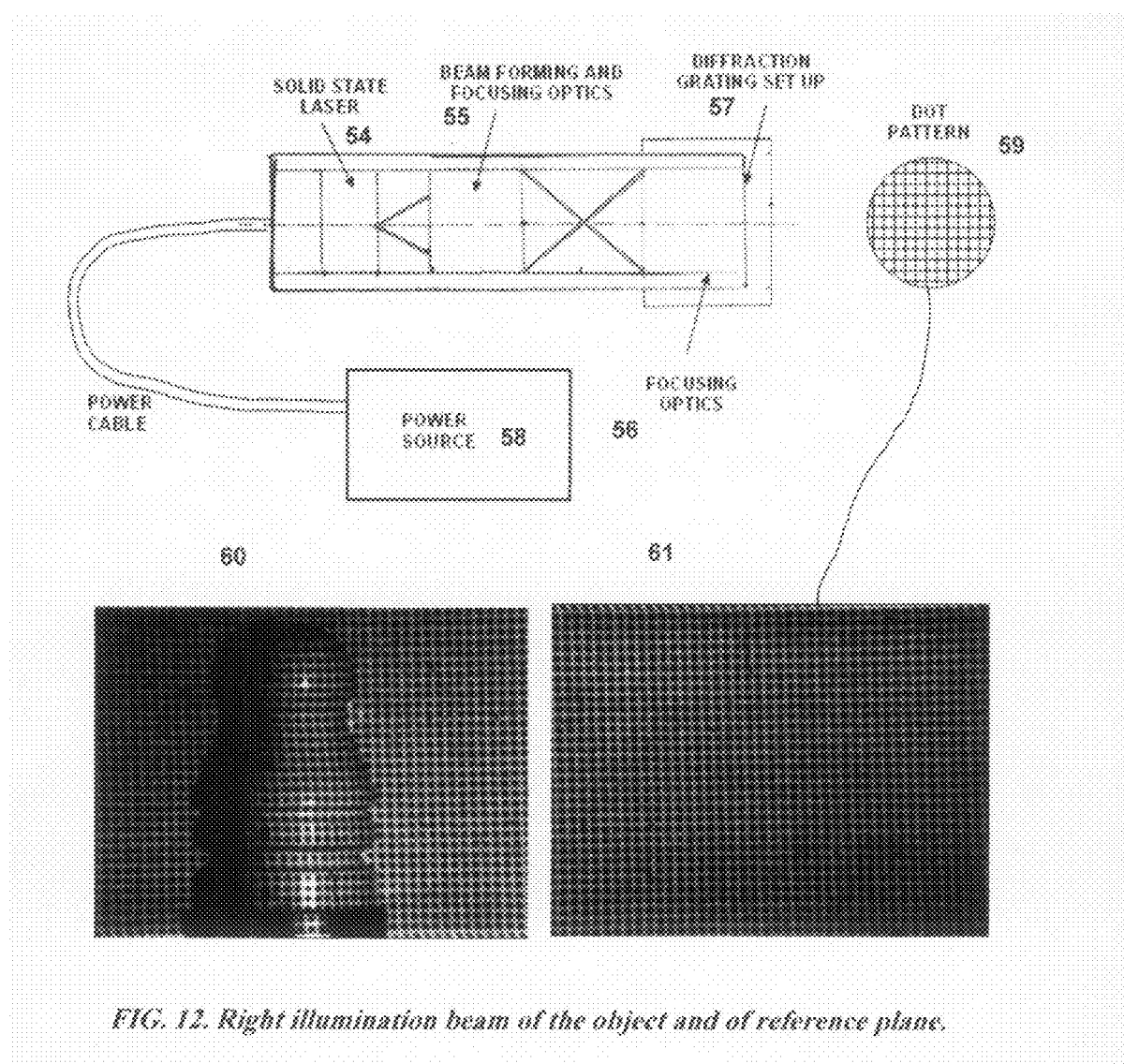
FIG. 12. Right illumination beam of the object and of reference plane.

114

SYSTEM AND METHOD FOR ANALYZING DISPLACEMENTS AND CONTOURING OF SURFACES

CROSS REFERENCE TO RELATED APPLICATIONS

The present patent application is a formalization of a previously filed, provisional patent application entitled "System and Method for Analyzing Displacements and Contouring of Surfaces," filed Sep. 15, 2006, as U.S. patent application Ser. No. 60/844,778 by the inventor named in this application. This patent application claims the benefit of the filing date of the cited provisional patent application according to the statutes and rules governing provisional patent applications, particularly 35 USC §119 and 37 CFR §1.78. The specification and drawings of the cited provisional patent application are specifically incorporated herein by reference.

COPYRIGHT

A portion of the disclosure of this patent document contains material which is subject to copyright protection. The owner has no objection to the facsimile reproduction by anyone of the patent disclosure, as it appears in the Patent and Trademark Office files or records, but otherwise reserves all copyright rights whatsoever.

FIELD OF INVENTION

This invention is related to an optical system to obtain contours of objects and/or their deformations. In particular, the present invention relates to a system and method comprising light projectors and a detector, including those outside of the visible range, to obtain one or more images, and a signal processing unit that processes the images to determine the contours and/or deformations.

BACKGROUND

The present invention relates to determining the shape and dimensions of industrial products that is of great importance in manufacturing processes. One important aspect involves reverse engineering of products in order to accurately obtain their shapes and dimensions. There exits a great variety of devices to arrive at the shape and dimensions of bodies. There is a very developed industry in the metrology area including manufacturers of high precision machines that have an annual market in billions of dollars. A prominent role is played by the CMM machines that use high precision mechanical and electronic devices and a contacting probe to provide the coordinates of a point with accuracies that can be beyond the micron. Against this background optical technologies are being developed that try to match the high precision and accuracy of CMM machines. High precision mechanical devices are replaced by sophisticated software and hardware. Optical techniques provide two advantages: the non-contact aspect and the benefits of field information rather than point information.

All the optical non contact methods of contouring involves the measurement of parallax, some times called disparity in machine vision literature. Parallax is a vector resulting from the difference of the projective coordinates of a point in the space when projected into a plane from two different points. There is a large variety of optical methods that use directly the methodology developed in aero-photogrammetry. This technology has been applied for many years to the field of aerial recognizance. It has reached a great deal of sophistication in the developed software and in the optical devices developed for short range measurements. On the other hand optical methods based on the moiré technology are very old, the first technical applications date from 1929 and their adoption by engineers from the 1940's. (See, e.g., P. Dantu, "*Détermination expérimentale des flexions dans une plaque plane,*" *Annales des Ponts et Chaussées* 1-40, 272-344 (1940), and R. Weller and B. M Sheffard, "*Displacement measurement by mechanical interferometry,*" *Proceedings of the Society of Experimental Stress Analysis* 6, 35-38 (1948). The connection between moiré and parallax measurement was pointed out for the first time by L. Pirodda, "*Principi e applicazioni di un metodo fotogrammetrico basato sull' impiego del moiré,*" *Rivista Italiana di Ingegneria* 12, 1-12 (1969)).

As far as the optical technologies are concerned a great explosion has taken place and hundred's of publications can be found in the literature. These publications are characterized by different simplifications of the basic model first suggested in Pirodda. Some times the methods are called methods base on structured light, without realizing the extensive literature that came form the 1960's moiré method developments. In spite of all these developments, very few fundamental contributions have been made that add to the body of knowledge.

It was realized for the first time that to characterize completely a surface it is necessary to project or to generate more than one system of fringes, for example two orthogonal systems of lines. (See, e.g., W Schreiber and G. Notni. "*Theory and arrangements of self-calibrating whole-body three-dimensional measurement systems using fringe projection technique,*" *Optical Engineering* 39, 159-169 (2000), and C. Reich, R. Ritter and J. Thesing, "*3-D shape measurement of complex objects by combining photogrammetry and fringe projection,*" *Optical Engineering* 39, 224-231 (2000)). This conclusion was reached on the basis of the similitude of moiré and photogrammetry. A formal derivation of this requirement was made in C. A. Sciammarella, L. Lamberti, and D. Posa, "*Techniques to analyze displacements and contouring of surfaces,*" *Proceedings of the 2007 SEM Conference on Experimental Mechanics*, St. Louis, Mo. (2006). Using differential geometry it was shown that as it is well known by mathematicians surfaces are tensor entities and in $R^3$, surfaces are tensors of second order. Hence an orthogonal system of moiré fringes is required to obtain the information required to characterize a surface.

Although various systems have been proposed which touch upon some aspects of the above problems, they do not provide solutions to the existing limitations in providing an optical system that provides accurate information regarding the contours and/or deformation of an object. The most successful model to date in the sense of producing commercial applications is the one proposed by Takeda M, Mutch K, "*Fourier transform profilometry for the automatic measurement of 3-D measurement shapes*", *Applied Optics*, Vol. 22, No. 24, (1983). This model gave rise to an industrial application in metrology and it was implemented in an optical device manufactured by Opton that, to this date, is the most evolved commercial firm producing non contact whole-field, 3D moiré measurement machines. This company produces four different models of moiré 3-D cameras, and three standard machines in competition with CMM machines. Opton is at the same time a producer of measuring machines and a user of them in a number of products that this company and their affiliated companies manufacture in different countries such as U.S.A, Germany, Japan, and Mexico. Takeda's 1983 model continues to be used for pattern analysis by Opton.

Effect of Modeling in the Accuracy of Contouring Moiré Methods

There are several factors that limit the accuracy that can be achieved using the moiré method of contouring. The most important factor is the model used to extract the information encoded in the pattern. Takeda's model is an approximation that does not take into account some important projective geometry, differential geometry and physical optics factors. The consequence of the model limitations in accuracy goes from the 10's to the 100's of microns, depending on the surface. Most models of moiré, published in the literature, have the same limitations.

The model adopted by Schreiber et al. address the problem of projective geometry. Their model utilizes Pirodda's approach in its most comprehensive form. Moiré is a form of photogrammetry. By inference the equation of moiré are the equations of photogrammetry converted into angular variables. The photogrammetry equations are ill conditioned, that makes computations more difficult. Sciammarella et al. adopted a different approach that addressed a particular type of problem, to find the profile of a tooth of a high precision gear. This approach starts with a rigorous result of projective geometry (viewing and projecting from infinity) and adds corrective functions for finite distances of projections and observations. The effect of physical optics on the geometrical optics is also considered. In one illustrative example, the results were compared with the results of measuring the same profile with a Zeiss CMM machine of ±1 micron for one standard deviation. Both sets of values agreed within this margin of accuracy.

Another source of uncertainty in the application of moiré methods to metrology is the quality of the patterns that can be obtained. This quality depends on the properties of the surface under measurement. Particularly difficult are highly reflecting surfaces. In order to have good contrast fringes, the surface must be a diffusive surface. The diffusivity of the surface depends on the roughness of the surface. Low roughness surfaces are highly reflecting thus they send back the light that impinges upon them in the direction of the angle of reflection. Hence the contrast of the signal will be good in the direction of reflection, but these reflections in general overwhelm the camera. If one reduces the intensity of the light then the projected signal will not be seen in the other areas of the surface.

To solve this problem Opton utilizes a commercially available white spray. This spray leaves a dust that is easily removable, but according to Opton has thicknesses that vary from 30 to 100 microns. This is of course a source of uncertainty in the measurements since the thickness of the applied coating becomes an unknown. Sciammarella et al. have utilized a thinner coatings also of a dusty nature easily removable but with thicknesses that seem not to have had an impact on the measurements because of a successful comparison of measured values with the moiré method and with a CMM machine with a ±1 micron guaranteed accuracy.

The quality of the projector is also of importance in the sense that it must produce an accurate carrier. Size and weight of the projector is of importance if a portable reading head is used in connection with applications to machines similar to CMM machines. The accuracy of the results also depends greatly on the methods used in fringe pattern analysis. Not all the patterns produced by surfaces can be analyzed by simple and fast routines. Highly sophisticate methods are needed to get accurate results from fringe patterns. The complexity of the software increases in the case of moiré contouring patterns.

Finally the information obtained is limited to a certain restricted region. Hence the sensor must be moved in the space and rotated of different angles. Somehow the information must be connected from one view to another. The CMM machines use heavy tables and sensors to relate measurements done in a position to measurements done in a different position. Many optical sensors use correlation methods to match different measurements. Correlation methods are not precise enough to guarantee high precision results. Opton machines seem to have a combination of change of coordinates equations based on certain marks made in the measured surface with conventional techniques used in CMM machines.

In summary, there is a well established moiré technology in competition with the CMM machines. Of course moiré based machines produce an amount of information that is impossible to achieve with a CMM machines. This capability has a direct impact in productivity if one considers the impact of ISO9000. By introducing the moiré method machines some inspection procedures that are made by hand can be done automatically resulting in digital data. These data can be easily compared with CAD model in a computer. 3-D data are needed for product shape modeling. This task can be accomplished with a speed that the touching machine cannot compete with. The existing moiré machines of Opton go from inspection areas of the order of 20×40 cm with a depth range of 40 cm, with accuracies of the order of 10 microns on a single view of 12 mm×14 mm and depth of ±3 mm, to machines that measure areas of the order of 3 m×1 m depth of work of 1 m. Single view of 1 m×1.135 m, with accuracy of ±500 microns and depth of view of ±50 cm.

Issues that arise in the current moiré contouring technology are summarized below:

Issues Concerning Current Moiré Technology Measuring Machines

Object issues. Quality of images, low contrast fringes, shape complexity, occlusions and shadow areas are problems associated with the object.

Fringe visibility and signal quality issues. As in any other experimental methods, the signal to noise ratio is of paramount importance. In the moiré-fringe projection method there two very important factors, one is the fringe contrast and the other is the sinusoidal shape of the fringe pattern.

Mathematical model issues. Limitations arising from the adopted model and adequate interfacing between geometric optics and physical optics.

Software issue. Software is required for data acquisition, data processing and data output. To improve the quality of the signal that contains the information, it is necessary to introduce software for the manipulation of pixel information. Data processing requires robust software for phase computation. It is also necessary to introduce phase unwrapping algorithms that can handle singular points and singular lines introduced by geometrical discontinuities in the field of view.

Limited area of observation and surface matching issues. Due to the limited area that can be viewed as well as due to occlusions and shadows different views must be matched to each other. The matching method must be as accurate as the measuring method otherwise the matching process will be the factor determining the accuracy of the method. Many of the current shadow-projection moiré methods address this problem by utilizing correlation methods as matching tools. The correlation methods yield results whose accuracy is lesser that the accuracy that can be obtained by the direct observation.

Consequently, there is a need for an optical device that addresses the following:

Issues Addressed by the Present Invention

Object issues. Perhaps one of the most limiting factors to handle diverse objects is the surface properties and its impact on the quality of the signal recorded. In this invention the problem of the quality of the signal is addressed by utilizing coherent light. In one embodiment, a solid state laser is used as the light source. Utilizing gradient optics the laser light is concentrated at a point source that illuminates a grating that produces diffraction points that illuminate the surface. By using polarization it is possible to control the balance between the reflected and the diffused light hence optimizing the contras of the dots on the black background of the inter-fringe zero intensity areas. With this method good contrast fringes are obtained in metal surfaces either coated or uncoated. Furthermore pixel intensity manipulation by software makes it feasible to get better quality signals.

Fringe visibility and signal quality issues. The sinusoidal structure of the signal is guarantied in the method and apparatus of the present invention by the coherent point source illumination. Furthermore the use of a system of orthogonal fringes allows the handling of problem areas such as those that partially obscured by shadows and by transitions between surfaces.

Mathematical model issues. The present invention implements Sciammarella's mathematically correct model that addresses all the projective and differential geometry issues and the physical optics issues. The application of this mathematical model is easily implemented on the apparatus disclosed in this invention.

Software issues. The present invention utilizes a software that addresses the following issues:
  a. Distinction between regions that are convex and concave;
  b. A fixed reference zero common to all observations;
  c. Fringe extensions in areas where the fringes may be partially missing;
  d. Transitions between surfaces; and
  e. Handling singularities that prevent the unwrapping of fringes at singular point, singular lines and singular areas.

Limited area of observation and surface matching issues. The present invention addresses these issues by representing surfaces that make up the body in one single coordinate system and applying the methods in connection between different views.

SUMMARY

The present invention discloses a system and method by which the contours and/or deformations of an object may be determined. The system comprises two or more projectors, a reference surface that comprises an orthogonal grating, and a processing unit that captures and processes images that contain the contours and/or deformations of the object. The method comprises illuminating the reference surface and the object by double or quadruple illuminations, via the projectors, and obtaining a set of images via the processing unit.

In one aspect, a system is disclosed comprising a reference surface, two projectors, a camera, and a processing unit coupled with the camera to obtain the contours of an object. The reference surface is illuminated via the two projectors and two separate images are obtained. The processing unit subtracts the two reference images to obtain a reference phase image a reference phase image. The projectors then illuminate the object and two object images are captured utilizing the processing unit. The two object images are subtracted to generate an object phase image. The processor then subtracts the object phase image from the reference phase image to arrive at an image that comprises the contours of the object.

In another aspect, a system is disclosed comprising a reference surface, four projectors, a camera, and a processing unit coupled with the camera to obtain the contours of an object. Preferably, two contour images of the same object can be obtained by repeating the aforementioned process to improve the accuracy of the results. Preferably, a depth of focus of the camera can be determined and the reference surface may be moved within the depth of focus to arrive at one or more calibration images. The calibration images may be utilized to generate an x-correction function and a y-correction function that can be applied to the contour images to correct for the x and y coordinate points. Preferably, two Moiré images can be generated from the two corrected contour images to obtain the principal curvatures of the surface of the object. Preferably, the two principal curvatures may be utilized to obtain a mathematical model of the surface of the object, which may be used in combination with the two corrected contour images to arrive at a more accurate contour image via an optimization process.

In another aspect, a system is disclosed comprising a reference surface, two projectors, a camera, and a processing unit coupled with the camera to obtain the contours of an object of multiple regions. The method comprises obtaining the contours of a first and second region, wherein the second region overlaps with the first region, correcting for x and y coordinate points, and matching the two regions to obtain the contours of the two regions. This method may be repeated to cover the entire surface of the object.

BRIEF DESCRIPTION OF THE DRAWINGS

FIG. 1 shows a photogrammetry arrangement with one projector and one camera to obtain the contouring of a surface.

FIG. 2 shows a description of a 3D surface geometry by combining two systems of orthogonal lines.

FIG. 3 illustrates a 2-D mapping for converting 2-D fringe patterns into a 3-D surface.

FIG. 4 shows a surface cross section in a plane orthogonal to $u_2$ shown in FIG. 3.

FIG. 5 shows a stereo configuration where the epipolar lines are parallel in the image plane to coordinate axis.

FIG. 6 shows a schematic diagram of epipolar lines and unit sphere in case of viewing and projection from infinity.

FIG. 7 shows a system for determining parallax.

FIG. 8 shows the effect of beam divergence on the projected pitch size.

FIG. 9 shows an example of matching of mathematical model and experimental results. Case of a spherical surface: (a) before and (b) after the optimization.

FIG. 11 shows a schematic diagram of a preferred embodiment of several components of the optical system of FIG. 10.

FIG. 12 shows a preferred embodiment of a projector and images of a reference surface and object illuminated by such projector.

DETAILED DESCRIPTION OF THE PRESENTLY PREFERRED EMBODIMENTS

Figure 10:
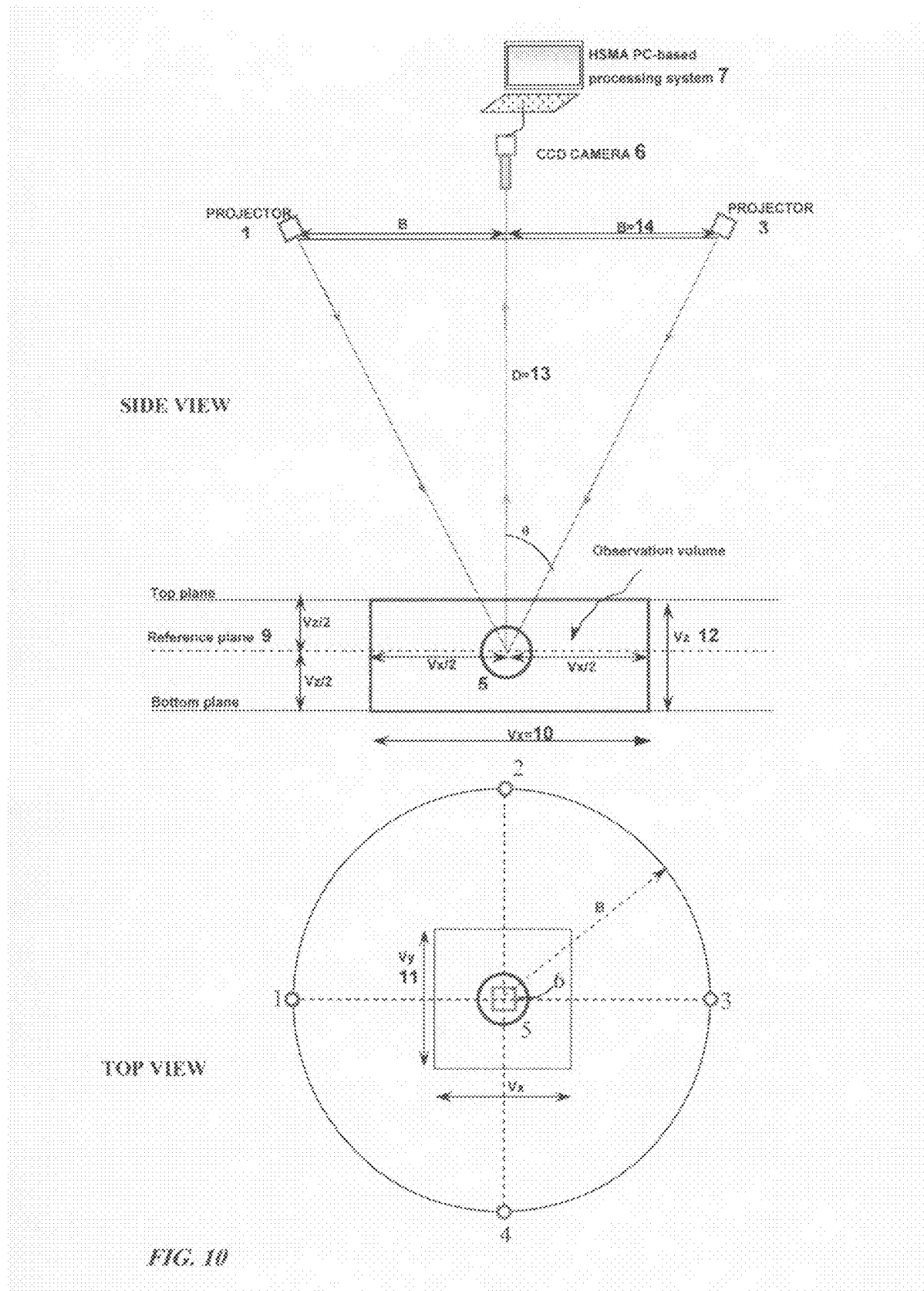
FIG. 10 shows a schematic diagram of a preferred embodiment of an optical system to determine contours and/or deformation of an object.

The following provides a description of the invention and the many embodiments through which it may be implemented in a system to obtain contours and/or deformations of an object.

Photogrammetry and Moiré

Most of the approaches to generalize the projection moiré method are based on the utilization of the equations of photogrammetry that are the result of utilizing the pinhole model for cameras and projectors. FIG. 1 shows the case of one camera and one projector whose operations are governed by the system of equations [1]. The plane $\pi_R$ is the reference plane; $X^W_i$ with i=1, 2, 3. is the global coordinate system; the camera is represented by the projection center C, the image plane $\pi_1$ and the distance from the projection center to the image plane $f_c$. In the projection center and in the image plane there are two Cartesian coordinate systems $X^C_i$ and $X^C_{iI}$ with i=1,2. The equation [1] corresponds to two cameras but can be also applied to a camera and one projection system. To reduce the amount on unknowns one can assume that the projector optical system is identical to the camera system.

$$\begin{cases} \pi^C_{x1} - x^C_{1H} = -f_C \cdot \left[ \dfrac{\alpha^C_{11}(x^W_1 - x^W_{1C}) + \alpha^C_{12}(x^W_2 - x^W_{2C}) + \alpha^C_{13}(x^W_3 - x^W_{3C})}{\alpha^C_{31}(x^W_1 - x^W_{1C}) + \alpha^C_{32}(x^W_2 - x^W_{2C}) + \alpha^C_{33}(x^W_3 - x^W_{3C})} \right] \\ \pi^C_{x2} - x^C_{2H} = -f_C \cdot \left[ \dfrac{\alpha^C_{21}(x^W_1 - x^W_{1C}) + \alpha^C_{22}(x^W_2 - x^W_{2C}) + \alpha^C_{23}(x^W_3 - x^W_{3C})}{\alpha^C_{31}(x^W_1 - x^W_{1C}) + \alpha^C_{32}(x^W_2 - x^W_{2C}) + \alpha^C_{33}(x^W_3 - x^W_{3C})} \right] \end{cases} \quad (1)$$

The $\alpha_{ij}$ are the direction cosines that provides the rotation between $X^C_i$ and $X^W_i$ with i,j=1, 2, 3. The above system of equations contains 9 parameters, the three coordinates of the projection center, the three independent rotations that characterize the position of the camera optical axis in the world coordinate system, the value of $f_c$, and the two coordinates of the intersection of the optical axis of the camera with the image plane. There are a total of 12 unknowns, the 9 parameters of the system assuming symmetry between camera and projection system and the three coordinates of the point under analysis. If one performs the calibration of the assembled optical system, for each point of the object one has a system of two equations with three unknowns. Hence the system (1) is not enough to solve the problem. There are a number of different procedures that one can utilize to add the necessary additional conditions. The aim of this invention is to reformulate the problem in such a way that by selecting properly the geometry of the set up and the data processing one can arrive at a general instrument that provides high accuracy contouring data with maximum efficiency and a minimum of data manipulation. In this way an environment is created that departs from photogrammetry and all the different approaches that try to merge photogrammetry with moiré. Although the basics of the two techniques have a commonality of elements, the new way of approaching the problem eliminates a number of unnecessary steps that have been inherited from the photogrammetry.

Connection Between the Basic Differential Property of Surfaces and Moiré

In order to develop the subject matter of this invention we must introduce material that belongs to differential geometry of surfaces. Due to different type of notations and conventions, to facilitate the understanding of the text we introduce the main equations that are needed. To analytically describe a surface it is necessary to resort to differential geometry. In differential geometry a simple surface is defined as a mapping, FIG. 2, of a two dimensional coordinate patch into the surface. Utilizing Cartesian coordinates of base $e_i$ where i=1, 2, 3 a point P of the surface is represented by a vector, $$x_P = u_1 e_1 + u_2 e_2 + x_3 e_3 \quad (2)$$

One can always represent a surface utilizing the Monge's parametric expression, $$x_3 = f(u_1, u_2) \quad (3)$$

By replacing (3) in (2), $$x_P = u_1 e_1 + u_2 e_2 + f(u_1, u_2) e_3 \quad (4)$$

The projection moiré method is an optical method that can be applied experimentally to find the required information to describe a surface, using the parametric model shown in FIG. 2. The parameters $u_i$ can be represented by the orders $n_j$ of a system of orthogonal gratings projected onto the surface. The moiré projection method is based on the measurement of parallax using projected gratings hence two directions of projection will be required as it is shown herein, in agreement with the conclusions arrived in Pirodda, and Schreiber et al., following a different argument based on the equations of photogrammetry. Here, the argument is directly connected to the differential geometry properties of surfaces. Equation (3) is a vectorial equation that maps a point of the coordinate patch $u_1$, $u_2$ into a point P in the 3-D space.

A simple surface in 3-D is characterized by a second order tensor, the tensor of curvatures. It is possible to start with the concept of curvature vector. The curvature vector of a section is given by, $$K = E \frac{d^2 u_1}{dl^2} + G \frac{d^2 u_2}{dl^2} + E' \left( \frac{du_1}{dl} \right)^2 + 2F' \frac{du_1}{dl} \frac{du_2}{dl} + G' \left( \frac{du_2}{dl} \right)^2 \quad (5)$$

In the above equation dl is an element of arc of a curve on the surface, and E and G are defined by, $$E^2 = E_{u_1} \cdot E_{u_1} = \left(\frac{\partial x_1}{\partial u_1}\right)^2 + \left(\frac{\partial x_2}{\partial u_1}\right)^2 \qquad (6)$$

$$G^2 = G_{u_2} \cdot G_{u_2} = \left(\frac{\partial x_1}{\partial u_2}\right)^2 + \left(\frac{\partial x_2}{\partial u_2}\right)^2 \qquad (7)$$

E', F' and G' are defined by $$E' = \frac{\partial^2 x_p}{\partial u_1^2} = \frac{\partial^2 x_1}{\partial u_1^2} e_1 + \frac{\partial^2 x_2}{\partial u_1^2} e_2 \qquad (8)$$

$$G' = \frac{\partial^2 x_p}{\partial u_2^2} = \frac{\partial^2 x_1}{\partial u_2^2} e_1 + \frac{\partial^2 x_2}{\partial u_2^2} e_2 \qquad (9)$$

$$F' = \frac{\partial^2 x_p}{\partial u_1 \partial u_2} = \frac{\partial^2 x_1}{\partial u_1 \partial u_2} e_1 + \frac{\partial^2 x_2}{\partial u_1 \partial u_2} e_2 \qquad (10)$$

Taking the vectorial product of equation (5) with $n_0$, the unit normal at the point P, with the notation, $$L = n_o \wedge E' \qquad (11)$$

$$M = n_o \wedge F' \qquad (12)$$

$$N = n_o \wedge G' \qquad (13)$$

where the symbol $\wedge$ indicates the vectorial product. Setting the origin of coordinates at the point P the expression of the normal curvature $\kappa_n$ vector becomes, using the notation $$\frac{du_1}{dl} = \cos\varphi, \frac{du_2}{dl} = \sin\varphi:$$

$$\kappa_n = L\cos^2\phi + 2M\cos\phi + N\sin^2\phi \qquad (14)$$

By taking the module of the $\kappa_n$ vector, Eq. (15) can be transformed into the polar coordinates equation, $$\pm 1 = \|L\|\xi^2 + 2\|M\|\phi\eta + \|N\|\eta^2 \qquad (15)$$

with the notation, $$\kappa_n = \frac{1}{r^2}, \xi = r\cos\varphi, \eta = r\sin\varphi.$$

Equation (15) is the conic indicatrix that defines the type of curvature at a given point of the surface. The solution depends on the discriminant, $$\Delta = \|L\| \cdot \|N\| - \|M\|^2 \qquad (16)$$

Connection Between Differential Geometry and the Moiré Method

FIG. 3a and FIG. 3b illustrate the concept utilized to experimentally implement the two dimensional mapping that converts the 2-D dimensional patch into a 3-D surface. A system of orthogonal gratings is projected onto the surface to be analyzed, a camera views the surface. Each projected grating provides a section of the surface given by equations $$x_1 = u_1 \qquad (17)$$

$$x_2 = u_2 \qquad (18)$$

$$x_3 = f(u_1, u_2) \qquad (19)$$

Assuming that we project and view from infinity, FIG. 4 illustrates one of the sections. The coordinate $x_3$ is measured along the normal to the reference plane where the camera is focused and therefore to a scale factor corresponds to the camera image plane. The distance between the point and the reference plane is given by, $$x_3(u_1, u_2) = \frac{p}{tg\theta} \frac{\phi_{x_1 m}(u_1, u_2)}{2\pi} \qquad (20)$$

where $\phi_{x_1 m}(u_1, u_2)$ is the modulation function of the carrier parallel to the $x_2$-axis and at the same time the modulation function of the moiré fringes. If in place of observing the carrier (projection moiré) we observed the moiré fringes (shadow moiré); p is the pitch of the projected grating on the surface of the reference plane, θ is the illumination angle. If we consider a system of orthogonal lines parallel to the $x_1$-axis, we will have the function $\phi_{x_1 m}(u_1, u_2)$. From Eq. (20), and making $x_3 = h$, $$\phi_{x_1 m}(u_1, u_2) = \frac{2\pi}{p} h(u_1, u_2) tg\theta \qquad (21)$$

where we have replaced $S(u_1, u_2)$ shown in FIG. 3 with $h(u_1, u_2)$. The instantaneous frequency of the modulated carrier is (See, C. A. Sciammarella and T. Kim, "*Frequency modulation interpretation of fringes and computation of strains*", Experimental Mechanics 45, 393-403 (2005)):

$$\frac{1}{2\pi} \frac{\partial \phi_{x_1 m}(u_1, u_2)}{\partial u_1} = \frac{1}{p} + E_{11}(u_1, u_2) \qquad (22)$$

where $\phi_{x_1 m}(u_1, u_2)$ is the phase of the modulated carrier, and $$E_{11} = \frac{\partial \phi_{x_1 m}(u_1, u_2)}{\partial u_1} \qquad (23)$$

The following relationships can be written:

$$\frac{\partial \phi_{x_1 m}(u_1, u_2)}{\partial u_1} = \frac{2\pi}{p} (\nabla S)_{u_1} \cdot e_1 \qquad (24)$$

Derivative in the $x_2$ direction can be expressed:

$$E_{12} = \frac{\partial \phi_{x_1 m}(u_1, u_2)}{\partial u_2} = \frac{2\pi}{p} (\nabla S)_{u_1} \cdot e_2 \qquad (25)$$

In a similar fashion we can compute for the orthogonal system of lines, and the corresponding the modulation function $\phi_{x_1 m}(u_1, u_2)$ $E_{22}$, and $E_{21}$.

We can compute now the phase of the modulation function (argument of the moiré fringes) by subtracting from the phase of the modulated carrier, the phase of the carrier.

$$\phi_m = \phi_{x_1 m} - \phi_{x_1 c} \qquad (26)$$

In this case we have an affine projection that preserves the similarity between the sections of a surface with a plane, and the projection of these sections into a plane parallel to the sectioning planes. This projection gives moiré fringes that are level lines of the surface. From $\phi_{x_1m}(u_1,u_2)$ we can obtain Eqs. (23), (25), $$E = \frac{\partial x_p}{\partial u_1} = E_{11}e_1 + E_{12}e_2 \quad (27)$$

$$G = \frac{\partial x_p}{\partial u_2} = E_{21}e_1 + E_{22}e_2 \quad (28)$$

$$F = E_{11}E_{21} + E_{12}E_{22} \quad (29)$$

The second derivatives, $$E' = \frac{\partial E_{11}}{\partial u_1}e_1 + \frac{\partial E_{21}}{\partial u_1}e_2 \quad (30)$$

$$F' = \frac{\partial E_{11}}{\partial u_2}e_1 + \frac{\partial E_{22}}{\partial u_1}e_2 \quad (32)$$

$$G' = \frac{\partial E_{12}}{\partial u_2}e_1 + \frac{\partial E_{22}}{\partial u_2}e_2 \quad (32)$$

The above equations indicate that the corresponding quantities are not invariants but they transform as the coordinate axis transform. The theorem of existence for surfaces tells that if we obtain the quantities defined by equations (27) to (32) we have defined a simple surface. The obtained quantities defined in equations (28) to (30), must satisfy the condition that:

$$\|E\|^2\|G\|^2 - F^2 > 0 \; E^2 > 0, G^2 > 0 \quad (33)$$

The first order and second order derivatives also must satisfy the compatibility equations. The compatibility equations are expressed in terms of the general tensorial algebra and involve the first and second order derivatives that have been defined in (27) to (32). These equations can be expressed in different ways; one particular type of expressions is the Mainardi-Codazzi equations.

The conclusion of this analysis is that in order to obtain the complete information of a surface we must utilize the parallax generated by the projection of two orthogonal systems of gratings. The projection moiré method thus has a similar structure to the intrinsic moiré utilized to define the strain tensor. In both cases we are dealing with mathematical entities that are tensors, thus we need to generate the components of the involved tensors. The strain tensor in 2D and the tensor that defines the curvatures of simple surfaces are both second order tensors in 2D. The strain tensor in 2D is defined by the projections of the gradient vectors of the two functions that describe the projected displacement in two orthogonal directions. In total we have four derivative, two for each surface that describe the projections of the displacement vector. These four derivatives are not independent and, therefore, they must satisfy the compatibility conditions of continuum mechanics. Likewise for a surface we need four gradient projections that provide the rate of change of the two components of the gradient vector at a point of a surface. These quantities can be obtained when two orthogonal gratings are projected onto a surface. This is the basic reason why to obtain the information concerning a 3-D surface a system of orthogonal gratings is required. Again the four projections are not independent from each other and must satisfy the compatibility equations that arise from the general theorem of existence of surfaces. In both cases we utilize orthogonal Cartesian tensors. Hence, the moiré method allows us to implement the differential geometry analysis of simple surfaces directly and, thus, to obtain all the necessary information to retrieve information about surfaces with a high degree of accuracy.

Selection of the Geometry of the Set Up that Will Maximize the Efficiency of the Retrieval of Surface Information; the Projective Geometry and Moiré

Pirodda established the first connection between projective geometry and the moiré projection method by concluding that the moiré method was a process of contouring based on parallax measurement. One can arrive at the classical assumption utilized in many of the applications of shadow moiré, supported by Eq. (20), in the case that the projection is done from infinity and the observation is also performed from infinity the moiré pattern resulting from the difference of phase of the reference grating and the projected grating gives the level lines or lines of equal height with respect to a reference plane. The reference plane in one of the embodiments of the present invention is a virtual plane that is memorized by the computer system assembled for data retrieval.

The concept of parallax is a fundamental concept in human vision and has been extended to all vision systems. At the same time the reference plane is a coordinate-plane that will be used to describe the observed surface. The concept of parallax is a fundamental concept in the understanding the connection between moiré and projective geometry. The concept of parallax is associated with a two lens system. This concept was extended by Pirodda to a camera and a projector. In this invention the role of the camera in the determination of the parallax is removed. Four symmetrically located projectors are utilized. The four projectors are required to define a surface as a tensorial entity as it has been shown in above. Both projectors and cameras can be represented by the pinhole camera model. Cameras and projectors can be arranged in accordance with the most convenient geometries to achieve certain particular objectives.

If we consider one camera and two projectors, FIG. 5, the line $\overline{C_{P1}C_{P2}}$ that connects the two optical centers of the projectors is called the base line. A point P of the reference plane, reached by rays coming from the optical centers of the projectors defines an epipolar plane. We call epipolar line the intersection of this plane with projectors and camera image planes. If we put the optical center of the camera in the epipolar plane along the normal to the reference plane, we define a Cartesian coordinate system such that all the epipolar planes intersecting the camera will give epipolar lines parallel to the coordinate axis X.

In FIG. 6 we assume that the base line is parallel to camera image plane as shown in FIG. 5. Further we assume that the camera and projector optical centers are at infinity. The epipolar lines are represented, FIG. 6, by the grating lines that are projected by the projector on the reference plane. The projection center of the camera is assumed to be oriented along the vertical line $C_\infty$. The epipolar points of the image plane of the camera, interceptions of the epipolar lines with the camera planes are also points at infinity. The projecting planes are planes that go through the projecting point P located at infinity and sending rays that are inclined of the angle $\theta$ with respect to the normal to the reference plane. The projecting planes intersect the reference plane in lines that are parallel to the $x_2$ coordinate direction. In the bottom of the figure is the unit sphere that illustrates all the directions involved and the corresponding points at infinity. We can add a second set of two projectors that send planes that intersect the camera image plane along lines parallel to the axis $x_1$. We have generated the orthogonal lines shown in FIG. 2. Then Eq. (20) can be written, $$h(x_1,x_2)=K\phi_m(x_1,x_2) \quad (34)$$

The height of the points of the surface is proportional to the phase of the moiré fringes generated by a carrier parallel to the $x_2$-axis. A similar equation can be written if we utilize projecting planes in the $x_2$ direction, $$h(x_1,x_2)=K\phi_m(x_1,x_2) \quad (35)$$

In the particular case of projection and observation from infinity, equations (34), (35), indicate that to get the contours of the surface we can use one or the other system of lines. However, recalling what was concluded above, if we want to have the invariants that completely describe the surface we must utilize both systems of lines, since the derivatives of the surface depend on the projection direction as it has been shown before. Phase derivatives can be obtained directly from the fringes without the determination of the modulation function, consequently the complete characterization of the surface can be achieved from the processing of the double system of fringes. The case analyzed before is the only case where we have a projective image that results in a geometrical similitude transformation. Eqs. (34), (35) seem to be a contradiction of what we have stated before that we need two systems of orthogonal lines to define the surface. This contradiction is only apparent because the phase functions that we obtain through the two different views will not be experimentally identical in the more general case, since the only case of similitude is the case of projection and observation from infinity. Even in this last case, Eqs. (34) and (35) will be two approximate measures of the real function (i.e., the surface to be contoured). Hence, we will have a redundant condition which will help us to reconstruct the surface with high accuracy. The next subject of this invention is the practical way of obtaining the condition of observation and projection from infinity, that are obstacles to be overcome in the case of high accuracy applications. In what follows, a methodology will be described that will provide the means to obtain the classical moiré fringe results with finite projection and observation points.

Approach to Extend the Classical Moiré Method to More General Conditions of Projection and Observation FIG. 7 shows the corresponding process of parallax determination. The plane $\Pi_P$ determined by the optical center of the left projector $PR_L$, the optical center of the right projector $PR_R$ and the point P intersects the reference plane $\Pi_R$ along a line perpendicular to the projected grid and parallel to the x axis. The illumination beams $I_L$ and $I_R$ project the point P, respectively, into points $P_L$ and $P_R$. If we draw the perpendicular from P to the segment $P_L P_R$ (i.e., the red line in the figure) we obtain the point P''' that provides the segments $u_R$ and $u_L$ that give the parallax of the point P resulting from the two projection centers. If we draw the plane $\Pi_N$, passing through P that intercepts the reference plane $\Pi_R$ along a line parallel to $P_L P_R$ (the $\Pi_N$ plane is denoted by the green color) and if we draw from P the normal to the reference plane we get the segment h (the violet line in FIG. 7), that gives the distance from P to the reference plane. If we consider the planes $\Pi_{PRN}$ (passing through $PR_R$ and P) and $\Pi_{PLN}$ (passing through $PR_L$ and P) which are both perpendicular to $\Pi_N$ we get the points $P''_R$ and $P''_L$. From FIG. 7 we get, $$u_T = u_L + u_R = h(tg\theta_{LZ} + tg\partial_{RZ}) \quad (36)$$

The normalized vectors illumination are given by, $$I_{RN} = \frac{1}{\sqrt{(x_P-x_R)^2+(y_P-y_R)^2+(z_P-z_R)^2}} \cdot \begin{vmatrix} x_P-x_R \\ y_P-y_R \\ z_P-z_R \end{vmatrix} \quad (37)$$

$$I_{LN} = \frac{1}{\sqrt{(x_P-x_L)^2+(y_P-y_L)^2+(z_P-z_{L^*})^2}} \cdot \begin{vmatrix} x_P-x_L \\ y_P-y_L \\ z_P-z_L \end{vmatrix} \quad (38)$$

The normalized vectors are, $$I_{RSN}=\cos\theta_{Rx}i+\cos\theta_{Ry}j+\cos\theta_{Rz}k \quad (39)$$

$$I_{LSN}=\cos\theta_{Lx}i+\cos\theta_{Ly}j+\cos\theta_{Lz}k \quad (40)$$

with, $$\begin{cases} \cos\theta_{Lz} = \frac{|h-L|}{\|\vec{I_{LN}}\|} = \sqrt{1-\cos^2\theta_{LX}-\cos^2\theta_{LY}} \\ \cos\theta_{Rz} = \frac{|h-L|}{\|\vec{I_{RN}}\|} = \sqrt{1-\cos^2\theta_{RX}-\cos^2\theta_{RY}} \end{cases} \quad (41\text{-}42)$$

Utilizing the relationship in moiré between displacement and grating pitch;

$$u_T = \frac{\Phi(x,y)}{2\pi}p(x,y) \quad (43)$$

Equation (43) shows that the parallax is only depending on the projectors and it does not depend on the camera. However the pitch of the grating is a function of the coordinates of the point, and this fact is a consequence of the projection of the carrier grating from a finite point as it will be shown in the next section Pitch of a Grating Projected from a Point Source on the Reference Plane FIG. 8 shows the model utilized to analyze the change of pitch with the coordinates. The projected grating can be thought as generated by two source points symmetrically located with respect to the optical axis of the projector. In such a case the projected fringes consist of hyperbolas. Since the distance between the two source points is very small compared to the distance to the plane of observation the hyperbolas will experience a very small change in the y direction with respect to straight lines. However, in the x-direction, the pitch of the fringes will have a rate of change that can not be neglected. The correct computation of the pitch must be done using the intersection of the hyperboloids, with centers in the two point sources that generate the grating, with the reference plane. As a first approximation, one can neglect the curvature of the wavefronts and assume that the wavefronts are planes. The model of FIG. 8 corresponds to this hypothesis. However, the hypothesis must be experimentally verified if one wants to model the grating projection. FIG. 8 shows the point of intersection A of the optical axis of one projector with the reference plane. The center of coordinates is the point A; the segment $\overline{AP}=mp_o$, where m is the magnification of the projector and $p_o$ is the pitch of projected grid. If the grid is projected from infinity, the pitch of projected grid is:

$$p_j = \frac{mp_o}{\cos\theta_p} \quad (44)$$

Because the grid is projected from point $PR_L$, the grid experiences an increment of pitch $\Delta p$. Considering the triangle BB'C, the pitch increment is:

$$\Delta p = \frac{mp_0 tg\theta_p}{\cos\theta_p} tg\alpha \quad (45)$$

with:

$$tg\alpha = \frac{mp_0}{D} \quad (46)$$

where D is the distance between the projection point $PR_L$ and A.

The change of projected pitch is:

$$\Delta p_j = p_j tg\theta_p tg\alpha \quad (47)$$

For two consecutive generic pitches (orders n and n+1), it can be written:

$$\Delta p_j = (n+1)p_j tg\theta_p tg\alpha - np_j tg\theta_p tg\alpha \quad (48)$$

The change of pitch per unit of pitch is hence a constant:

$$C_p = \frac{\Delta p_j}{p_j} \quad (49)$$

For the order n of the projected grating, it follows:

$$p_j(np) = p_j \pm np_j tg\theta_p tg\alpha = p_j(1 \pm ntg\theta_p tg\alpha) \quad (50)$$

Equation (50) can be rewritten as a function of the x-coordinate:

$$p_j(x) = p_j\left(1 \pm \frac{x}{p_j} tg\theta_p tg\alpha\right) \quad (51)$$

The double sign introduced in Eq. (51) depends on the relative orientation of the point source with respect to the origin of coordinates in the reference plane. With the same notation of FIG. 8, for the light coming from the left projector $PR_L$ the projected pitch will become smaller for negative values of the x-coordinate while it will increase for positive values of the x-coordinate. The opposite will occur for the light coming from the right projector $PR_R$. In view of this, one can write:

$$p(x) = p_j(1 \pm C_{1j}x) \quad (52)$$

where $$C_{1j} = \frac{tg\theta_p tg\alpha}{p_j} \quad (53)$$

By integration and utilizing the relationship between phase and grating pitch, the phase change $\Delta\phi_{PR_L}$ on the reference plane for the grating projected from the left source can be expressed as:

$$\Delta\phi_{PR_L}(x) = \frac{2\pi}{p_j}\int_x^0 \frac{dx}{1+C_{1j}x} = \Phi_{ref} - \frac{2\pi}{C_{1j}p_j}\ln|1+C_{1j}x| \quad (54)$$

In Eq. (54), the absolute value is denoted by ||. The "+" sign is justified by the fact that the projected pitch increases for positive values of x and decreases for negative values of x. The difference of phases is a signed quantity with respect to a zero phase difference at the origin of coordinates.

In a similar fashion, the phase change $\Delta\phi_{PR_R}$ on the reference plane for the grating projected from point $PR_R$ can be expressed as:

$$\Delta\phi_{PR_R}(x) = \frac{2\pi}{p_j}\int_x^0 \frac{dx}{1-C_{1j}x} = \Phi_{ref} - \frac{2\pi}{C_{1j}p_j}\ln|1-C_{1j}x| \quad (55)$$

where the "−" sign is justified by the fact that the projected pitch decreases for positive values of x and increases for negative values of x.

The subtraction of the phase determined for the left projector from the phase determined for the right projector gives the total phase difference $\Delta\phi_{TOT}$:

$$\Delta\phi_{TOT}(x) = \quad (55A)$$
$$\Delta\phi_{PR_R}(x) - \Delta\phi_{PR_L}(x) = \frac{2\pi}{C_{1j}p_j}\ln|1+C_{1j}x| + \frac{2\pi}{C_{1j}p_j}\ln|1-C_{1j}x|$$

which can be rewritten as:

$$\Delta\phi_{TOT}(x) = \frac{2\pi}{C_{1j}p_j}\ln|(1+C_{1j}x)(1-C_{1j}x)| \quad (55B)$$

Equation (55B) represents a positive symmetric function in the x-coordinate.

If we now consider the reference grating modulated by the surface, the total phase is, $$\phi_T(x,y) = \phi_P(x) + \psi_m(x,y) \quad (56)$$

Utilizing the double illumination epipolar arrangement and subtracting from the total phase of the modulated grating the phase corresponding to the reference plane the effect of the projection from a finite distance is removed. Hence we have the equivalent of a projection from infinity and hence we have the same condition that we have illustrated in FIGS. 4 and 6 as far the illumination is considered. Hence the sensitivity will be given by the same expression corresponding to the classical moiré, but in this case since we have doubled the parallax due to the symmetric illumination, then, $$h(x,y) = \frac{p_o m}{2\sin\theta_p} \frac{\phi(x,y)}{2\pi} \quad (57)$$

Therefore, we can write:

$$h(x,y) = K_o \phi(x,y) \quad (58)$$

The double illumination, together with the software subtraction of the phases of the two systems of lines, produces a phase distribution that it is equivalent to what will be obtained if one projects the system of lines from infinity. The modulation of the projected phase due to finite distance projection disappears by the subtraction operation. Of course the image is still the central projection of the object taken from the projection center of the camera lens system. Using infinity designed optics via telecentric lenses, the effect of the perspective effect can be minimized. In high precision measurements it is necessary to apply a correction. This correction is applied as described in Sciammarella, et al., above, providing a calibration of the different planes that are included in the observed image. Since the determination of the coordinate z is independent of the values of the coordinates x,y, the preceding correction is applied to the point location without affecting the coordinate Z. The lens aberrations are corrected by digital operations using the functions utilized in lens optics and taking into consideration the different planes that are included in the image. Furthermore the effect of the slope of the surface on the fringe profile is still present and can be corrected as shown in Sciammarella, et al.

General Formulation of the Contouring Problem

In the preceding sections we have outlined the process of getting the geometrical properties of a surface using the moiré technique as a tool to perform the necessary measurements to get the second order tensor that characterizes a surface in an intrinsic mode without a particular coordinate system. Furthermore moiré methodology processes have been introduced that makes it possible to implement in a practical way the use of the classical moiré method equations (observation and projection of a body from infinity) using a selected geometry. We have selected a system of reference to describe the contoured surface; a system of coordinates attached to the camera. Whether the camera moves or the object is moved depends on the particular circumstances, the position of the points of the body are given with respect to the system attached to the camera.

The points of a surface can not be retrieved at once but need to be obtained in successive images that need to be connected together. This problem implies the need to represent all the measured surfaces that make up a body in a common frame. The strategy followed in this patent is to work with geometrical primitives. The term geometrical primitives has different meanings in Computer Graphics (CG) and Computed Aided Design (CAD). Here, the phrase is used in the sense of providing the information required to characterize an experimentally determined geometrical shape. We will illustrate this notion, via one or more embodiments of the present invention, by referring to well defined geometrical shapes such as spheres, cones, and cylinders of different types. However the concept is general if the required mathematical formulation is introduced. In this approach one provides geometrical quantities that define the surface. We can then give in depth information, center of curvature, radii of curvature with their standard deviations. A mathematical model is created for the surface using the Monge's type of representation, $$z_{mat} = f(x_{mat}, y_{mat}) \tag{59}$$

where each point of the surface is defined by the coordinates $(x_{mat}, y_{mat}, z_{mat})$. The system of coordinates utilized to implement the mathematical model is the global reference system which finally defines the geometry of the object to be contoured. This coordinate system is selected in a way that connects it to the body under analysis, i.e. it can be related to axis of symmetry, or axis located at a given position in the body analyzed and at the end provide the complete description of the body in a non-ambiguous fashion.

The mathematical models are defined for each component of the surface, in the selected coordinate system that has be chosen according to the geometry of the analyzed body. This operation is illustrated in FIG. 9. In this figure we have the analytically defined surface with its coordinates $(x_{mat}, y_{mat}, z_{mat})$, and the optically retrieved surface with its coordinates $(x_{exp}, y_{exp}, z_{exp})$. Optically obtained information must be aligned with the object surface defined mathematically. This task is accomplished by using a general transformation of coordinates: each point $(x_{exp}, y_{exp}, z_{exp})$. is transformed into its corresponding $(x_{exp}^{tr}, y_{exp}^{tr}, z_{exp}^{tr})$. To achieve this transformation we need three translations and three rotations, Euler angles. To perform the alignment we need to apply the coordinate change.

$$\begin{cases} x_{exp}^{tr} = x_0 + x_{exp}(\cos\varphi\cos\psi - \cos\vartheta\sin\varphi\sin\psi) + y_{exp}(\cos\varphi\sin\psi + \cos\vartheta\sin\varphi\cos\psi) + z_{exp}(\sin\vartheta\sin\varphi) \\ y_{exp}^{tr} = y_0 + x_{exp}(-\sin\varphi\cos\psi - \cos\vartheta\cos\varphi\sin\psi) + y_{exp}(-\sin\varphi\sin\psi + \cos\vartheta\cos\varphi\cos\psi) + z_{exp}(\sin\vartheta\cos\varphi) \\ z_{exp}^{tr} = z_0 + x_{exp}\sin\vartheta\sin\psi + y_{exp}(-\sin\vartheta\cos\psi) + z_{exp}\cos\vartheta \end{cases} \tag{60}$$

where $x_0$, $y_0$, $z_0$ are the translation coordinates and $\phi,\psi,\theta$ are the Euler angles. Then, we have to minimize the difference between the mathematically defined geometry and the measured values. This can be done by solving an optimization problem where the objective is to minimize the gap $W_{obj}$ between the coordinates measured experimentally and their counterpart defined mathematically. The gap function $W_{obj}$ is defined as follows:

$$MinW_{obj} = \sqrt{\frac{\sum_{k=1}^{N}[z_{mat}^k - z_{exp}^{tr\,k}]^2}{N}} \tag{61}$$

where N is the number of control points at which coordinates are compared.

The optimization problem (61) includes as optimization variables the parameters $x_0$, $y_0$, $z_0$, and $\phi,\psi,\theta$ involved in the coordinate transformations and the geometric entities that define the shape under investigation (i.e., radii, angles of aperture, etc.). Optimization variables are recursively perturbed until a global minimizer of $W_{obj}$ is found. Such design vector is the desired optimum. Of course, one has to specify an initial value for each optimization variable. Should the initial guess be too far from the searched optimum value, the optimization process will require more iterations to be completed. The least-square type problem defined by Eq. (61) is an unconstrained optimization problem with side constraints on design variables. The problem can be efficiently solved using a standard gradient based optimizer like the ones one can find in the Optimization literature.

Merging of the Observed Patterns to a Common Coordinate System

In the preceding paragraph we have outlined a method to obtain the geometric primitives of a surface in a given coordinate system, which in general can be chosen to be connected to the geometry of the body. In view of the limited extent of sensors we will get partial regions of the object.

Hence we need to reduce images obtained from different positions of the investigated sample to the same coordinate system. In our contouring system we utilize a reference plane that is unchanged since it is a virtual plane attached to the camera. All the images are acquired with respect this reference plane. We use a double projection system in two orthogonal directions that uncouples the coordinate z, from x and y. Furthermore as we have previously shown by removing the phase of the reference plane from the object phase we obtain the equivalent of a projection from infinity. Moreover by correction of the x, and y coordinates we obtain a condition equivalent to the observation from infinity, i.e., equation (57) is valid for any position of the observed body. That is a similarity condition exists between the image and the actual body. Hence a rigid body motion of the sample that restores the position of the body at a given configuration will result in identical moiré patterns. The points of a moiré fringe will be at the same height h with respect to the reference plane, hence, they will have the same phase. An objective function can be defined in order to minimize the difference of the phases corresponding to two different positions 1 and 2. Following equation (59) we can define In accordance with the proposed method to obtain all the necessary quantities that define an arbitrarily shaped and oriented surface as a tensor of the second order it is necessary to record two images with symmetric double illumination. As derived in the section describing the general method corresponding to this invention by removing the phase of the reference plane from the phase of the analyzed surface, the obtained phase corresponds to a projection from infinity. At the same time the coordinates corrections by removing the effect of the central projection, provides a geometry of the captured image that has a similitude relation with the body itself. Hence the model corresponding to observation from infinity and projection from infinity can be applied. This implies that equation (56) of the text can be applied. Then to obtain the different derivatives required to compute the surface tensor components, equations (22) to (32) can be utilized.

FIG. 10 shows a schematic representation of the optical system in accordance with one embodiment of this invention. From a functional point of view, the system comprises the following components: an illumination system; signal detection means; data processing means; signal extraction means;

$$\begin{cases} x_2 = x_0 + x_1(\cos\varphi\cos\psi - \cos\vartheta\sin\varphi\sin\psi) + y_1(\cos\varphi\sin\psi + \cos\vartheta\sin\varphi\cos\psi) + z_1(\sin\vartheta\sin\varphi) & (62) \\ y_2 = y_0 + x_1(-\sin\varphi\cos\psi - \cos\vartheta\cos\varphi\sin\psi) + y_1(-\sin\varphi\sin\psi + \cos\vartheta\cos\varphi\cos\psi) + z_1(\sin\vartheta\cos\varphi) \\ z_2 = z_0 + x_1\sin\vartheta\sin\psi + y_1(-\sin\vartheta\cos\psi) + z_1\cos\vartheta \end{cases}$$

To apply Eq. (62) it is necessary to locate the corresponding points to be transformed. If we consider Eq. (56) and use the same reference plane and the same coordinate system defined in Section 5, recalling Eq. 57 where h=z, we can describe the surface through the vectorial equation:

$$\bar{Z} = \begin{Bmatrix} x_1 \\ y_1 \\ \Phi(x_1, y_1) \end{Bmatrix} \quad (63)$$

Moiré fringes are given by the intersections of the previous equation with the planes described by:

$$\bar{Z} = \begin{Bmatrix} x_1 \\ y_1 \\ np \end{Bmatrix} \quad (64)$$

If a rotation and a translation are applied to the body preserving the same reference plane as stated before, the new moiré fringes will be given by the equation:

$$\bar{Z}_2 = \begin{Bmatrix} x_2 \\ y_2 \\ np \end{Bmatrix} = [R] \begin{Bmatrix} x_1 \\ y_1 \\ np \end{Bmatrix} + \{T\} \quad (65)$$

The points to be matched, for the same value of np, are $x_1$ with $x_2$, and $y_1$ with $y_2$. The outlined procedure can be used to match different views of the same body provided that these view have regions that overlap. In the overlapping regions, by using Eq. (62) one can estimate the translation and the rotation that have created the new view and by reverse process we can put all the points in the same coordinate system.

data output means and a host processor. The illumination system in accordance with one embodiment of this invention comprises the illumination head having preferably four point sources (1, 2, 3, 4) in an orthogonal array as shown in FIG. 10 for illumination of the surface of the object 5 to be analyzed disposed about a camera 6. The projectors project a dot pattern on the surface of the object 5. The camera 6 captures the projected dot pattern. The light distribution on the object 5 surface is transformed in an electronic signal in the camera sensor. This signal is transmitted to the PC 7 via a fire wire connection. The PC contains a digital program that performs the data grabbing, the data processing and generates the output. The reference plane 9 is a virtual plane that is in the memory of the computer. The contouring process takes place within a volume V ($V_x$ 10, $V_y$11, $V_z$12). These distances depend on the camera and projector properties as well as on the distances D 13 and B 14.

An important element of this invention is the use of a point source as opposed to collimated illumination required for projection from infinity. There are two very important aspects to be considered. The first one that is of considerable impact is the fact that collimated illumination has no sensitivity to changes of depth of surfaces that are parallel to the reference plane, while the punctual illumination is sensitive to these changes. The software that is used for processing the information in the signal extraction and processing module introduces the corrections needed to replace collimated illumination with point sources. Tests performed with point source illumination have shown that the obtained results with point source illumination are as accurate as results obtained with collimated light. As a consequence of this invention large surfaces can be analyzed with the same software that it is used in the classical moiré without using large collimating lenses which will otherwise render the classical moiré technique cumbersome. The possibility of using the classical moiré approach has a very important impact in simplifying the operations needed to extract the surface information.

Although surface information can be extracted directly from point wise illumination and point wise observation, complexity of the necessary operations makes the required software far more complex as well as all the other operations required for coordinates merging.

In one preferred embodiment of the present invention shown in FIG. 11, the camera 15 is supported in a frame, with a horizontal beam 16 and two vertical tubular members 17 and 18. The vertical members of the frame, 17 and 18, allow a vertical motion of the camera making it possible to change the observation volume according to the different lenses, by changing the distance D18. The camera is supported in a system 19 with x, y, z adjustments, roll, pitch and yaw motion to give the proper inclination to the optical axis of the camera making it possible to adjust the position of the camera. The illumination head is supported by 4 tubular members 20, 21, 22, 23, The tubular members have a sliding carriages 24, 25, 26, 27, that have x, y and z motions, plus a system to change the angles that define the optical axis of the projector lasers 28, 29, 30, 31. The tubular members 20, 21, 22, 23 are supported in sliding carriages that allow the modification of the distances B32, B33, B34, B35. In this way it is possible to adapt the system for different volumes of observation. The sliding carriages are supported on rails 36, 37, 38, 39. The object 40 is mounted on a platform 41. The platform 41 has roll, pitch and yaw motions, as well as an accurate z motion system.

FIG. 12 shows a schematic diagram of a preferred embodiment of a projector system. A solid state laser 54 system produces the illumination and a power source 58 feeds the laser. The laser diode 54 emits a beam of light, a correction optics 55 shapes the beam and focuses it to a point source. A focusing optics 56 focuses the laser beam to a point on the surface to be analyzed. After the light has been focused, a diffraction grating set up 57 is added that will generate a pattern of dots or lines. The diffraction optics 59 creates the diffraction dots that are captured via the camera. Image 60 shows the pattern projected on the object that is being analyzed. Image 61 shows the pattern captured by the reference plane. Depending on the type of optical element the dots can be either dark or bright. The selection depends on the properties of the analyzed surface. The wavelength of the projector depends on the utilized diode. The optical element 59 can be changed to produce dots of different pitches.

Figure 13:
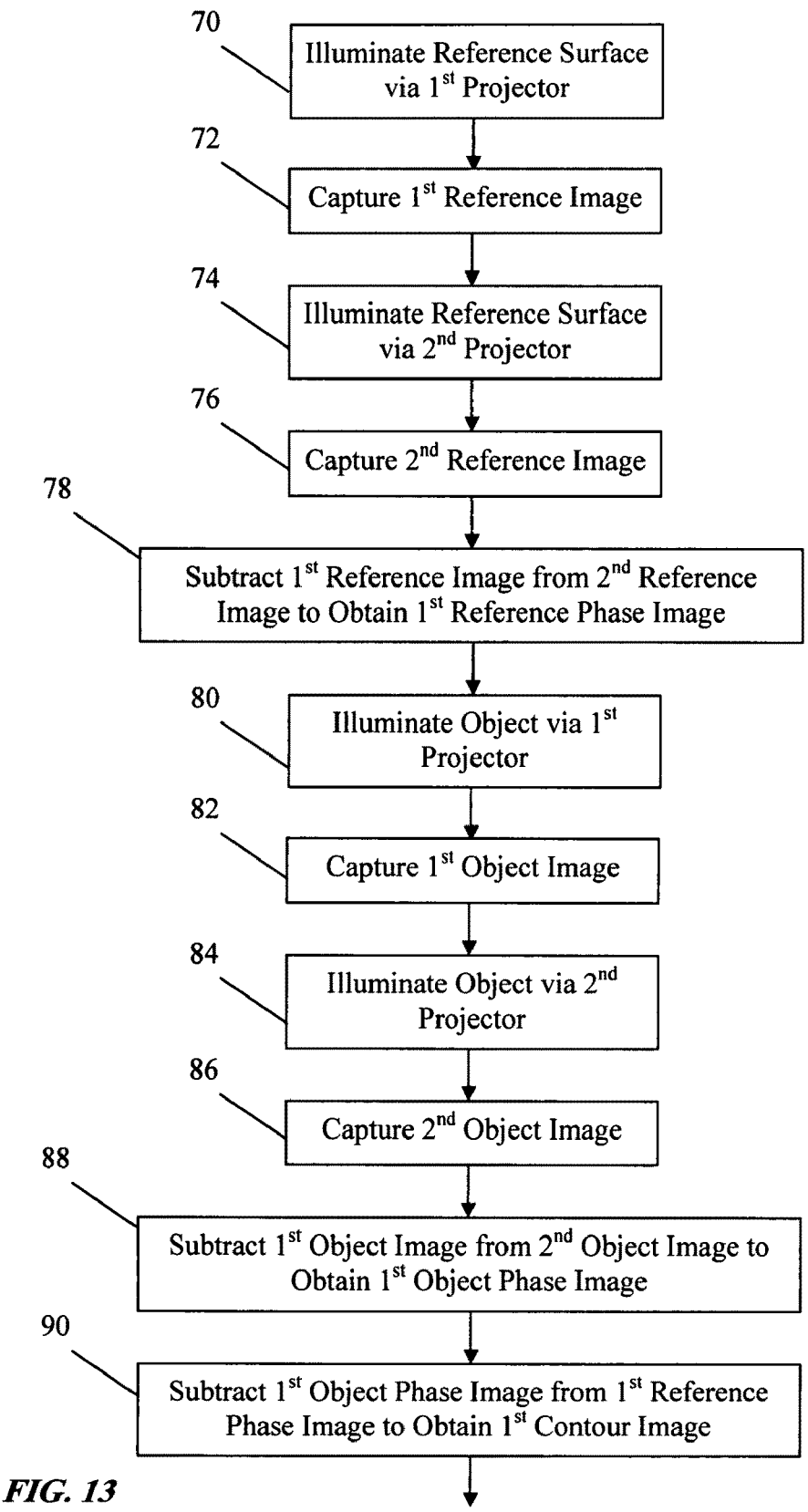
FIG. 13 is a flow diagram of one preferred method of obtaining a first contour image of an object according to the present invention.

FIG. 13 shows a flow diagram of one preferred method of determining contours of an object. This method may be implemented utilizing the optical system shown in FIG. 10. According to this method, the reference surface 9 is illuminated via a first projector 1 at 70, and a processing unit 7, coupled with a camera 6, captures a first reference image at 72. The reference surface 9 is then illuminated by a second projector 3 at 74, and the processing unit 7 captures a second reference image at 76. The processing unit 7 subtracts the first reference image from the second reference image to obtain a first reference phase image at 78. Object 5 is then illuminated via the first projector 1 at 80, and a first object image is captured at 82. The object 5 is then illuminated by the second projector 3 at 84, and the processing unit captures a second object image at 86. The first object image is then subtracted from the second object image to render a first object phase image at 88. The first object phase image is then subtracted from the first reference phase image to obtain a first contour image of the object at 90.

Figure 14:
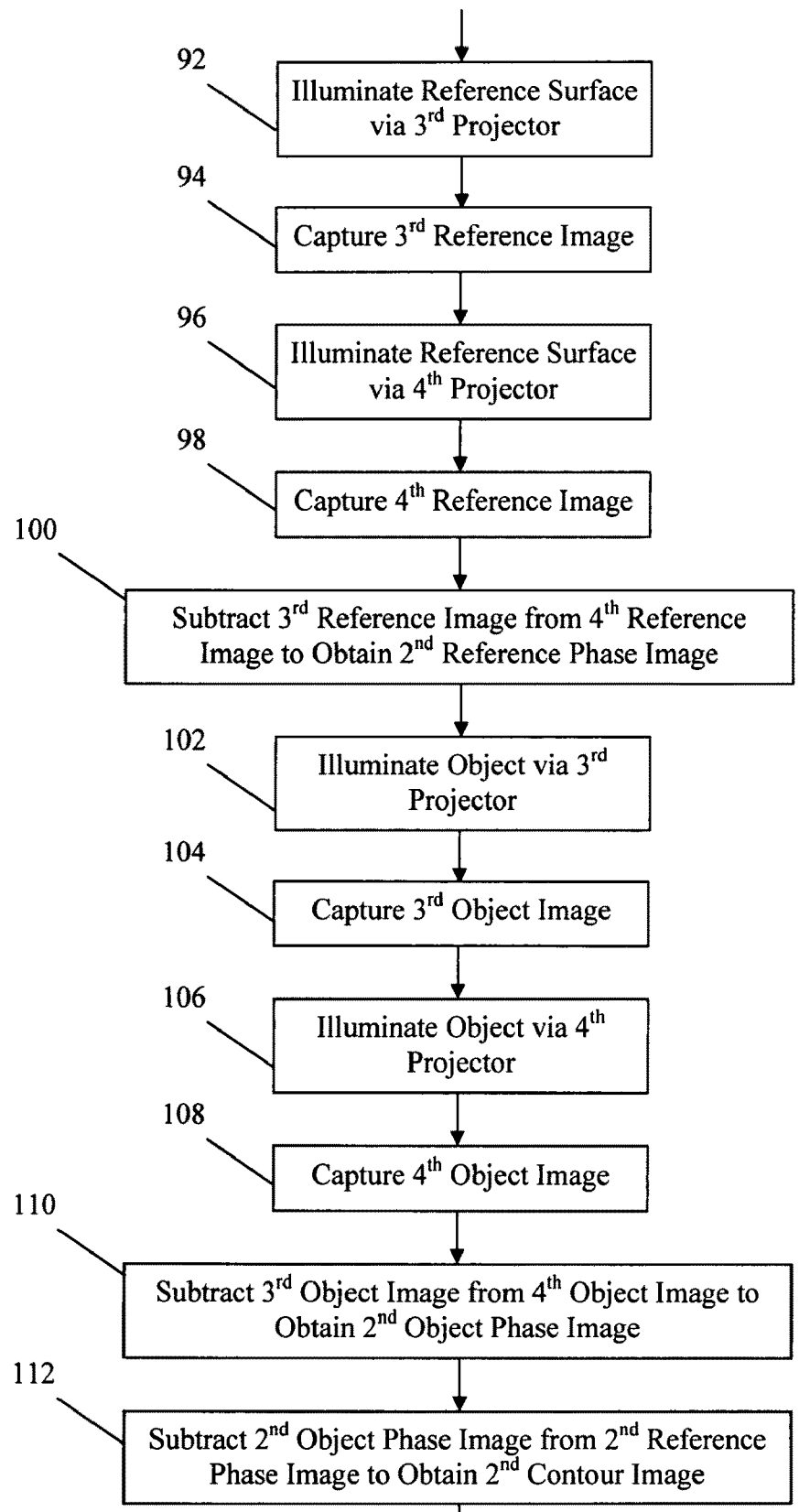
FIG. 14 is a flow diagram of one preferred method of obtaining a second contour image of the object according to the present invention.

FIG. 14 shows a flow diagram of one preferred method of determining contours of an object. This method may be implemented utilizing the optical system shown in FIG. 10. According to this method, the reference surface 9 is illuminated via a third projector 2 at 92, and the processing unit 7, captures a third reference image at 94. The reference surface 9 is then illuminated by a fourth projector 4 at 96, and the processing unit 7 captures a fourth reference image at 98. The processing unit 7 subtracts the third reference image from the fourth reference image to obtain a second reference phase image at 100. Object 5 is then illuminated via the third projector 2 at 102, and a third object image is captured at 104. The object 5 is then illuminated by the fourth projector 4 at 106, and the processing unit 7 captures a fourth object image at 108. The third object image is then subtracted from the fourth object image to render a second object phase image at 110. The second object phase image is then subtracted from the second reference phase image to obtain a second contour image of the object at 112.

Figure 15:
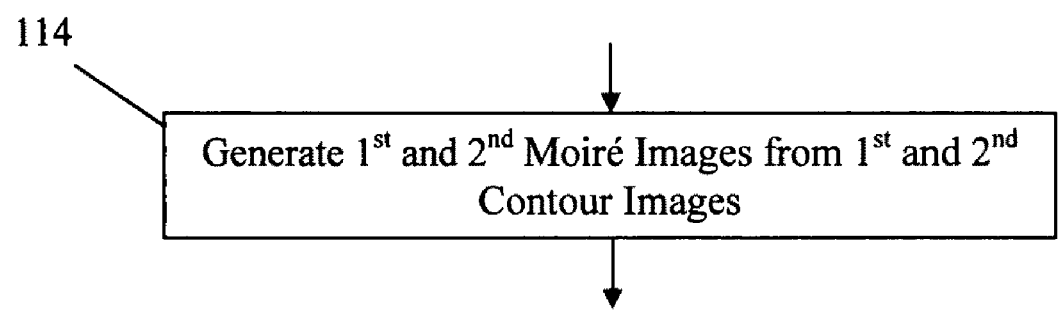
FIG. 15 is a flow diagram of one preferred method of obtaining a first and second Moiré Images from the first and second contour images.

FIG. 15 shows a flow diagram of one preferred method whereby a first and second Moiré images of the first and second contour images are generated using the processing unit 7. These Moiré images are utilized to generate a first and second principal curvatures of the surface of the object.

Figure 16:
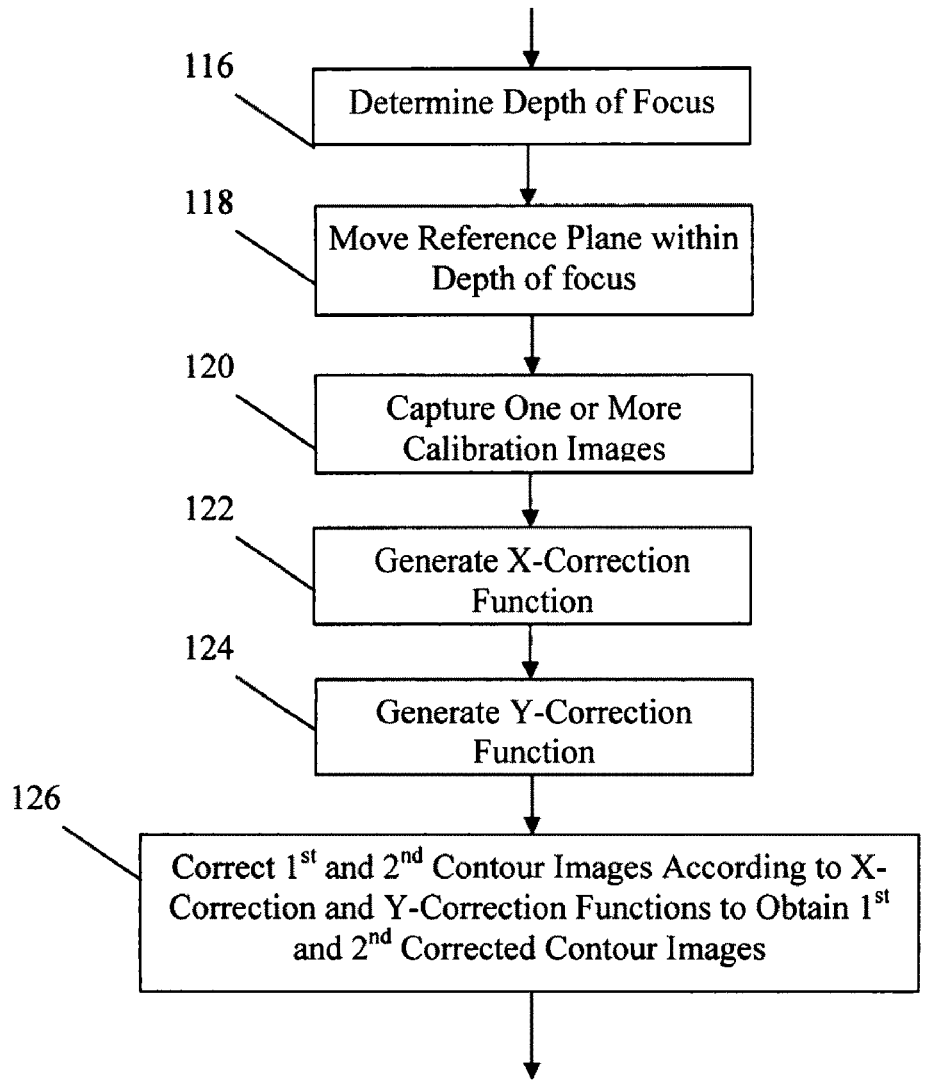
FIG. 16 is a flow diagram of one preferred method of obtaining a first and second corrected contour images.

FIG. 16 shows a flow diagram of one preferred method of correcting the contour images of the object as described above. According to this method, a depth of focus of the camera 6 is determined at 116. The reference plane 9 is then moved in one or more increments within this depth of focus at 118, and the processing unit 7 captures one or more calibration images according to the one or more increments at 120. The processing unit 7 then generates an x-correction and a y-correction function from the one or more calibration images at 122 and 124, respectively. The processing unit 7 then obtains a first and second corrected contour images by applying the x-correction function and y-correction function to the first and second contour images at 126.

Figure 17:
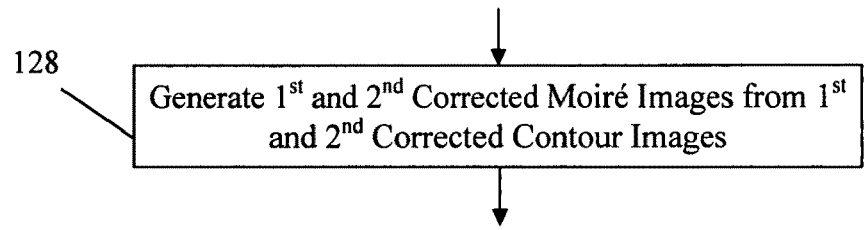
FIG. 17 is a flow diagram of one preferred method of obtaining a first and second corrected Moiré Images from the first and second corrected contour images.
Figure 18:
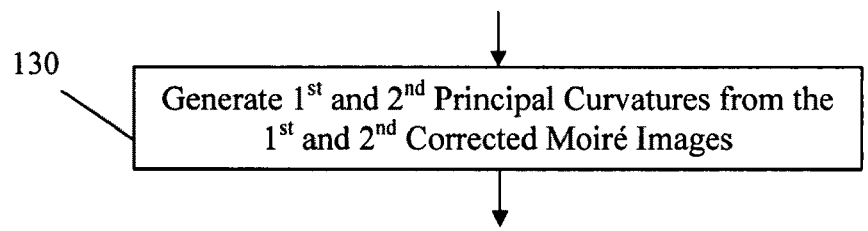
FIG. 18 is a flow diagram of one preferred method of obtaining a first and second principal curvatures.
Figure 19:
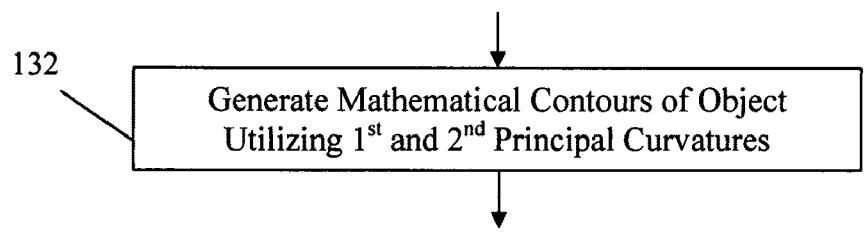
FIG. 19 is a flow diagram of one preferred method of obtaining mathematical contours of the object.
Figure 20:
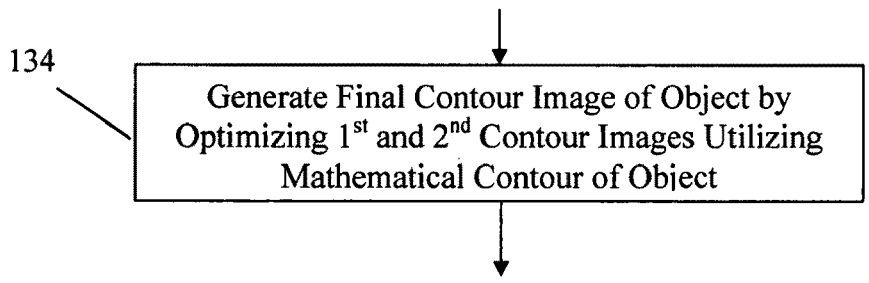
FIG. 20 is a flow diagram of one preferred method of obtaining a final contour of the object.

FIG. 17 shows a flow diagram of one preferred method whereby the processing unit 7 is utilized to obtain a first and second corrected Moiré images of the first and second corrected contour images at 128. FIG. 18 shows a flow diagram of one preferred method where the processing unit 7 generates the first and second principal curvatures of the surface of the object from the first and second corrected Moiré images at 130. FIG. 19 shows a flow diagram of one preferred method whereby the processing unit 7 computes a mathematical model of the contours of the surface of the object by utilizing the first and second principal curvatures at 132. The mathematical model may be one or more of a variety of well-known geometries such as a sphere, cylinder, cone, cube, etc. As described above, the processing unit 7 may generate a final contour image of the object by optimizing the first and second contour images utilizing the mathematical model of the contours of the surface of the object at 134, as shown in FIG. 20.

Figure 21:
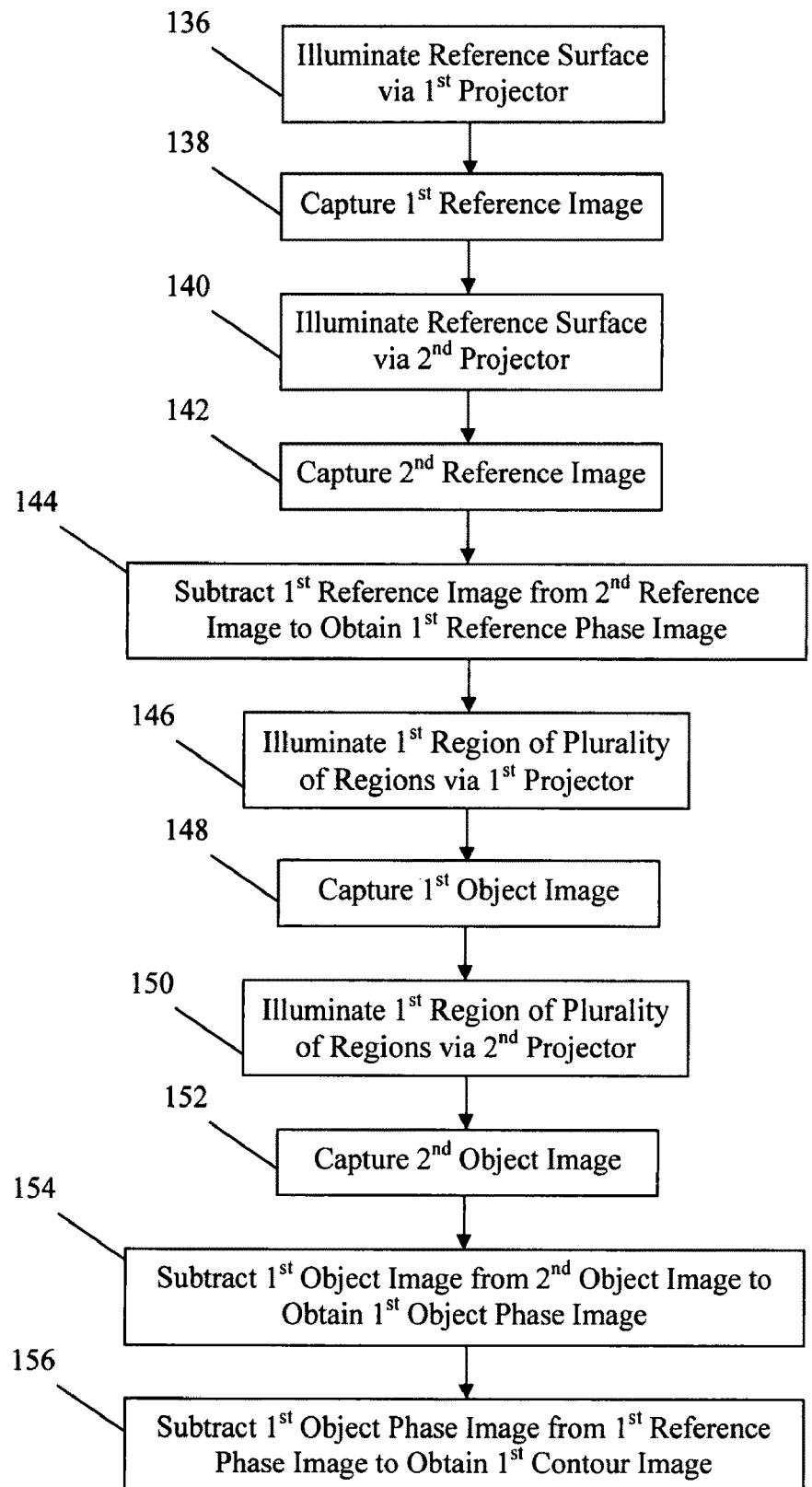
FIG. 21 is a flow diagram of one preferred method of obtaining a first contour image of a first region of an object according to the present invention.

FIG. 21 shows a flow diagram of one preferred method of determining contours of a region of an object comprising a plurality of regions. This method may be implemented utilizing the optical system shown in FIG. 10. According to this method, the reference surface 9 is illuminated via the first projector 1 at 136, and the processing unit 7, captures a first reference image at 138. The reference surface 9 is then illuminated by the second projector 3 at 140, and the processing unit 7 captures a second reference image at 142. The processing unit 7 subtracts the first reference image from the second reference image to obtain a first reference phase image at 144. A first region of the object 5 is then illuminated via the first projector 1 at 146, and a first object image is captured at 148. The first region of the object 5 is then illuminated by the second projector 3 at 150, and the processing unit 7 captures a second object image at 152. The first object image is then subtracted from the second object image to render a first object phase image at 154. The first object phase image is then subtracted from the first reference phase image to obtain a first contour image of the first region of the object 5 at 156.

Figure 22:
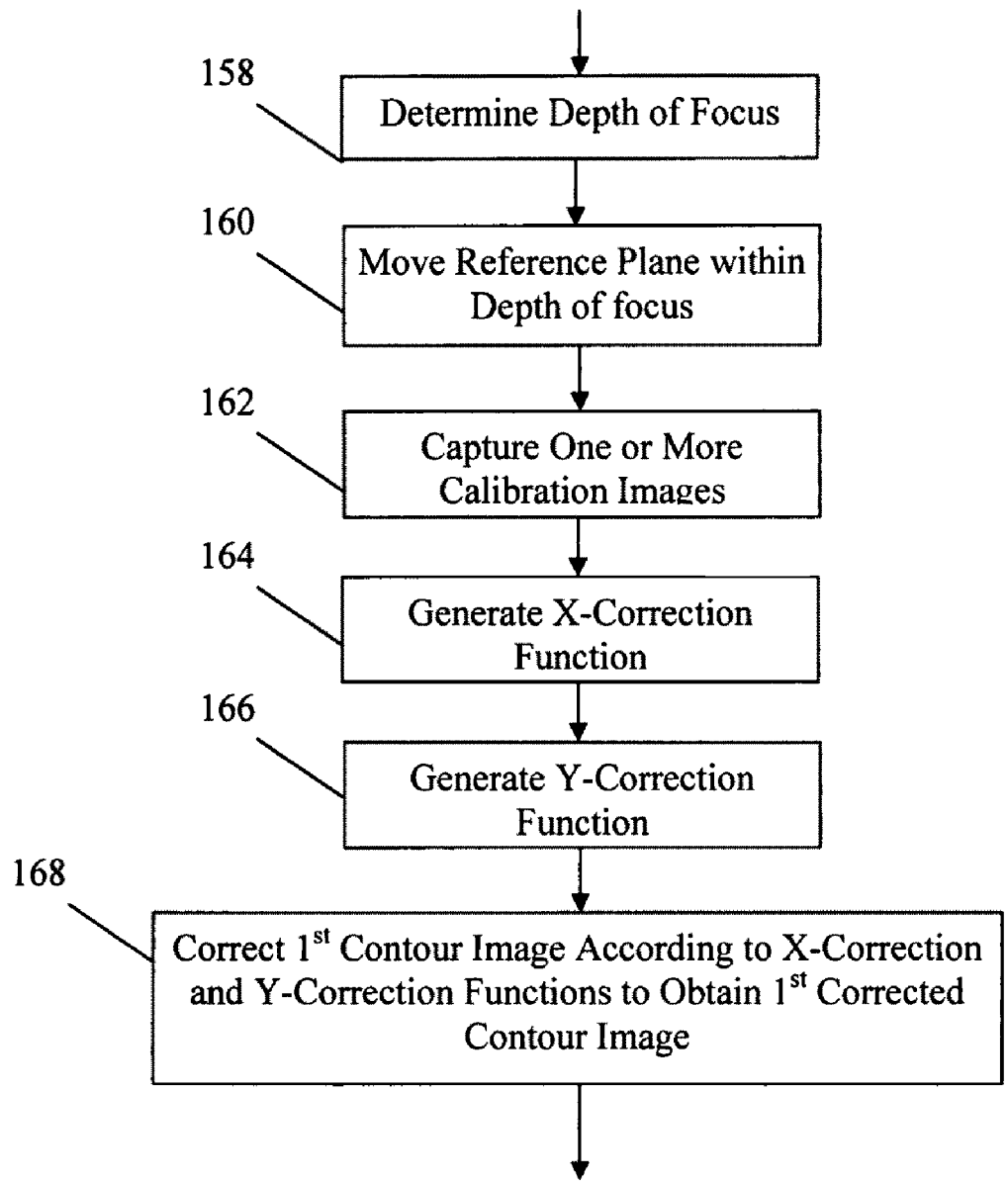
FIG. 22 is a flow diagram of one preferred method of obtaining a first corrected contour image.

FIG. 22 shows a flow diagram of one preferred method of correcting the first contour image of the first region of the object as described above. According to this method, a depth of focus of the camera 6 is determined at 158. The reference plane 9 is then moved in one or more increments within this depth of focus at 160, and the processing unit 7 captures one or more calibration images according to the one or more increments at 162. The processing unit 7 then generates an x-correction and a y-correction function from the one or more calibration images at 164 and 166, respectively. The processing unit 7 then obtains a first corrected contour image of the first region of the object 5 by applying the x-correction function and y-correction function to the first contour image at 168.

Figure 23:
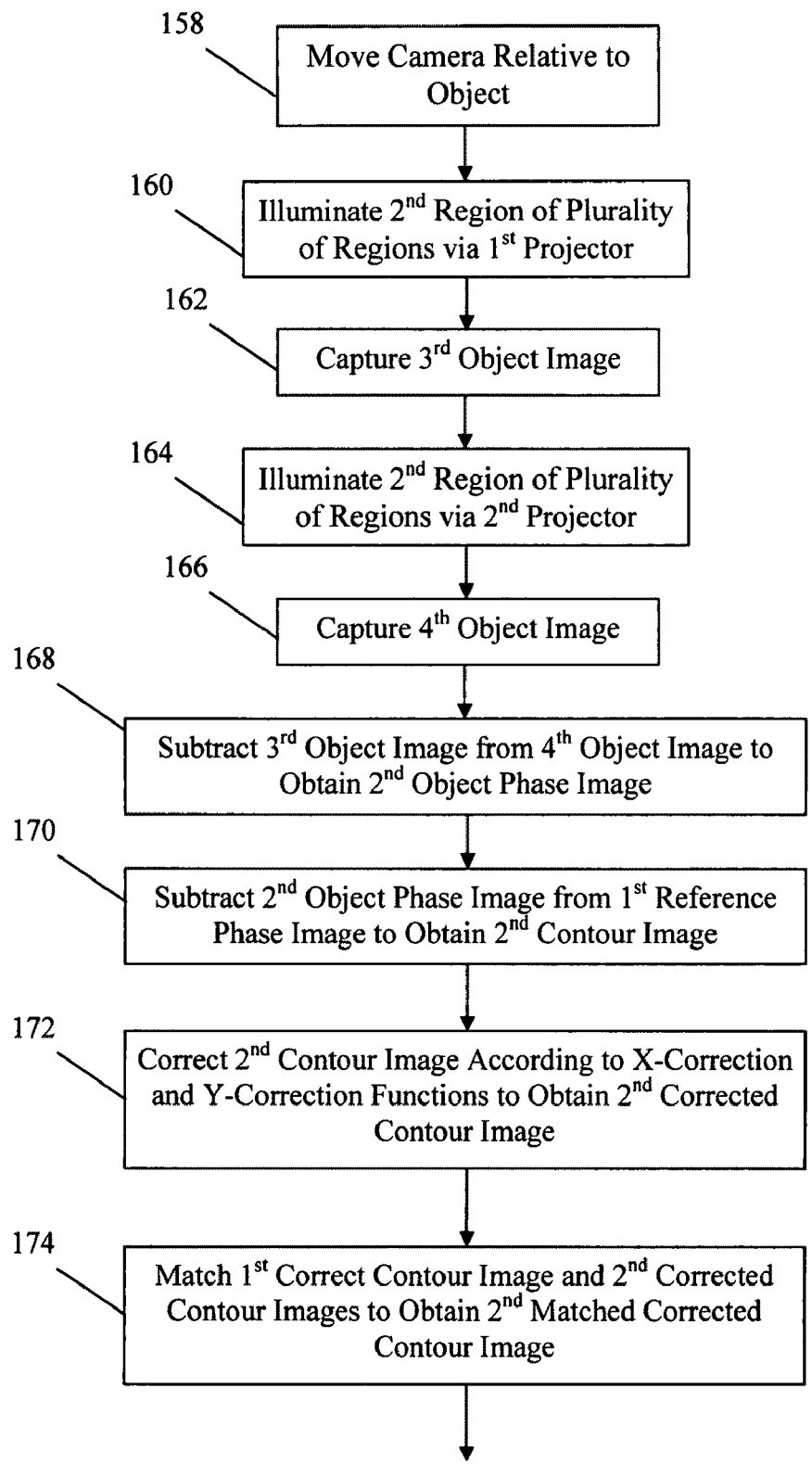
FIG. 23 is a flow diagram of one preferred method of obtaining a second matched corrected contour image.

FIG. 23 shows a flow diagram of one preferred method of determining contours of a second region of an object comprising a plurality of regions. This method may be implemented utilizing the optical system shown in FIG. 10. According to this method, the camera 6 is moved relative to the object to view the second region at 158. The second region is illuminated via the first projector 1 at 160, and a third object image is captured at 162. The second region of the object 5 is then illuminated by the second projector 3 at 164, and the processing unit 7 captures a fourth object image at 166. The third object image is then subtracted from the fourth object image to render a second object phase image at 168. Utilizing the processing unit 7, the second object phase image is subtracted from the first reference phase image to obtain a second contour image of the second region of the object 5 at 170. The processing unit 7 then applies the x-correction function and y-correction function to the second contour image at 172 to obtain a second corrected contour image. The processing unit then matches the first corrected contour image and the second corrected contour image to obtain a matched corrected contour image at 174. This process may be utilized to cover the entire surface of the object. In one preferred embodiment, the matching is performed by selecting a first sub-region from the first corrected contour image, selecting a second sub-region from the matched second corrected contour image, and obtaining a transformation matrix by minimizing a difference between the first and second sub-regions.

Figure 24:
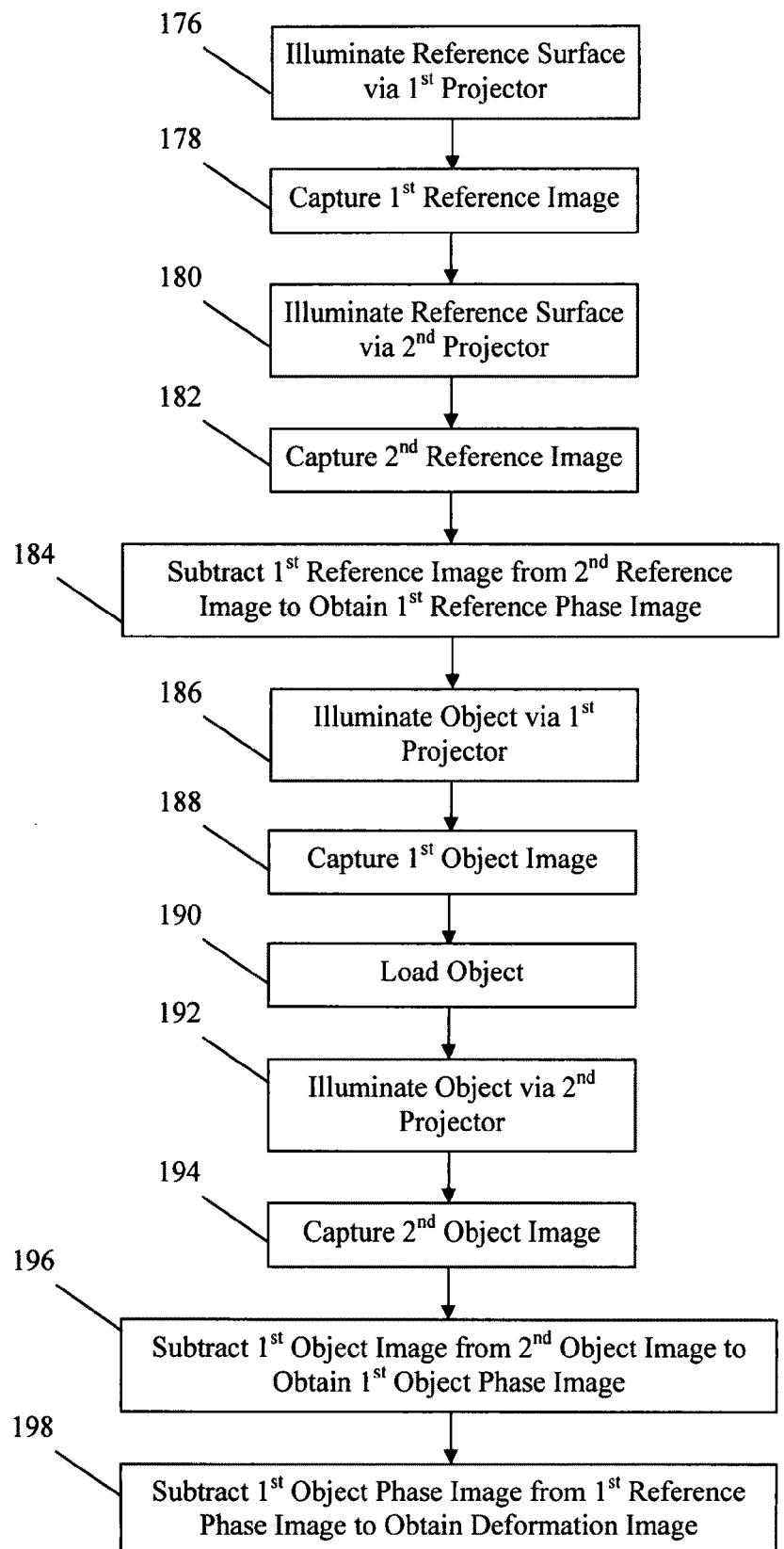
FIG. 24 is a flow diagram of one preferred method of obtaining deformation image of an object according to the present invention.

FIG. 24 shows a flow diagram of one preferred method of determining deformations of an object. This method may be implemented utilizing the optical system shown in FIG. 10. According to this method, the reference surface 9 is illuminated via the first projector 1 at 176, and the processing unit 7 captures a first reference image at 178. The reference surface 9 is then illuminated by a second projector 3 at 180, and the processing unit 7 captures a second reference image at 182. The processing unit 7 subtracts the first reference image from the second reference image to obtain a first reference phase image at 184. Object 5 is then illuminated via the first projector 1 at 186, and a first object image is captured at 188. The object 5 is then loaded at 190, illuminated by the second projector 3 at 192, and the processing unit 7 captures a second object image at 194. The first object image is then subtracted from the second object image to render a first object phase image at 196. The first object phase image is then subtracted from the first reference phase image to obtain the deformation image of the object 5 at 198.

The foregoing explanations, descriptions, illustrations, examples, and discussions have been set forth to assist the reader with understanding this invention and further to demonstrate the utility and novelty of it and are by no means restrictive of the scope of the invention. It is the following claims, including all equivalents, which are intended to define the scope of this invention.

What is claimed is:

1. An optical method for determining contours of an object, comprising:
   (1) illuminating a reference surface comprising an orthogonal grating, via a first projector;
   (2) capturing a first reference image of the reference surface, via a processing unit coupled with a camera and operative to receive video signals from the camera;
   (3) illuminating the reference surface, via a second projector;
   (4) capturing a second reference image of the reference surface, via the processing unit;
   (5) subtracting the first reference image from the second reference image, via the processing unit, to obtain a first reference phase image;
   (6) illuminating the object, via the first projector;
   (7) capturing a first object image, via the processing unit;
   (8) illuminating the object, via the second projector;
   (9) capturing a second object image, via the processing unit;
   (10) subtracting the first object image from the second object image, via the processing unit, to obtain a first object phase image; and
   (11) subtracting the first object phase image from the first reference phase image, via the processing unit, to obtain a first contour image comprising the contours of the object.

2. The method of claim 1, further comprising:
   (1) illuminating the reference surface, via a third projector;
   (2) capturing a third reference image of the reference surface, via the processing unit;
   (3) illuminating the reference surface, via a fourth projector;
   (4) capturing a fourth reference image of the reference surface, via the processing unit;
   (5) subtracting the third reference image from the fourth reference image, via the processing unit, to obtain a second reference phase image;
   (6) illuminating the object, via the third projector;
   (7) capturing a third object image, via the processing unit;
   (8) illuminating the object, via the fourth projector;
   (9) capturing a fourth object image, via the processing unit;
   (10) subtracting the third object image from the fourth object image, via the processing unit, to obtain a second object phase image;
   (11) subtracting the second object phase image from the second reference phase image, via the processing unit, to obtain a second contour image comprising the contours of the object.

3. The method of claim 2, further comprising generating a first and second moiré images from the first and second contour images, via the processing unit.

4. The method of claim 3, further comprising:
   (1) determining a depth of focus of the camera, via a first positioning system coupled with the camera;
   (2) moving the reference surface within the depth of focus in one or more increments, via a second positioning system coupled with the reference surface;
   (3) capturing one or more calibration images of the reference surface corresponding to the one or more increments, via the processing unit;
   (4) generating an x-correction function from the one or more calibration images, via the processing unit;

(5) generating a y-correction function from the one or more calibration images, via the processing unit; and
(6) correcting the first and second contour images according to the x-correction and y-correction functions, via the processing unit, to obtain a first and second corrected contour images.

5. The method of claim 4, further comprising generating a first and second corrected moiré images from the first and second corrected contour images, via the processing unit.

6. The method of claim 5, further comprising computing a first and second principal curvatures from the first and second corrected moiré images, via the processing unit.

7. The method of claim 6, further comprising generating a mathematical contour of the object by approximating the shape of the object to one of mathematically known objects utilizing the first and second principal curvatures, via the processing unit.

8. The method of claim 7, wherein the mathematically known objects comprise at least one of a sphere, a cylinder, a cone, and a cube.

9. The method of claim 7, further comprising generating a final contour image of the object, via the processing unit, by optimizing the first and second contour images utilizing the mathematical contour of the object.

10. An optical method for determining contours of an object wherein said object comprises a plurality of regions, said method comprising:
(1) illuminating a reference surface comprising an orthogonal grating, via a first projector;
(2) capturing a first reference image of the reference surface, via a processing unit coupled with a camera and operative to receive video signals from the camera;
(3) illuminating the reference surface, via a second projector;
(4) capturing a second reference image of the reference surface, via the processing unit;
(5) subtracting the first reference image from the second reference image, via the processing unit, to obtain a first reference phase image;
(6) illuminating a first region of the plurality of regions, via the first projector;
(7) capturing a first object image of the first region, via the processing unit;
(8) illuminating the first region, via the second projector;
(9) capturing a second object image of the first region, via the processing unit;
(10) subtracting the first object image from the second object image, via the processing unit, to obtain a first object phase image; and
(11) subtracting the first object phase image from the first reference phase image, via the processing unit, to obtain a first contour image comprising the contours of the first region of the object.

11. The method of claim 10, further comprising:
(1) determining a depth of focus of the camera, via a first positioning system coupled with the camera;
(2) moving the reference surface within the depth of focus in one or more increments, via a second positioning system coupled with the reference surface;
(3) capturing one or more calibration images of the reference surface corresponding to the one or more increments, via the processing unit;
(4) generating an x-correction function from the one or more calibration images, via the processing unit;
(5) generating a y-correction function from the one or more calibration images, via the processing unit; and
(6) correcting the first contour image according to the x-correction and y-correction functions, via the processing unit, to obtain a first corrected contour image.

12. The method of claim 11, further comprising:
(1) moving the camera relative to the object, via the first positioning system;
(2) illuminating a second region of the plurality of regions via the first projector wherein the second region overlaps with the first region;
(3) capturing a third object image of the second region, via the processing unit;
(4) illuminating the second region via the second projector;
(5) capturing a fourth object image of the second region, via the processing unit;
(6) subtracting the third object image from the fourth object image, via the processing unit, to obtain a second object phase image;
(7) subtracting the second object phase image from the first reference phase image, via the processing unit, to obtain a second contour image comprising the contours of the second region of the object;
(8) correcting the second contour image according to the x-correction and y-correction functions, via the processing unit, to obtain a second corrected contour image; and
(9) matching the first corrected contour image and second corrected contour image, via the processing unit, to obtain a matched second corrected contour image comprising the contours of the second region.

13. The method of claim 12, wherein the step of matching comprises:
(1) selecting a first sub-region from the first corrected contour image, via the processing unit;
(2) selecting a second sub-region from the matched second corrected contour image, via the processing unit; and
(3) obtaining a transformation matrix by minimizing a difference between the first and second sub-regions, via the processing unit.

14. An optical method for determining deformations of an object, comprising:
(1) illuminating a reference surface comprising an orthogonal grating, via a first projector;
(2) capturing a first reference image of the reference surface via a processing unit coupled with a camera and operative to receive video signals from the camera;
(3) illuminating the reference surface, via a second projector;
(4) capturing a second reference image of the reference surface, via the processing unit;
(5) subtracting the first reference image from the second reference image, via the processing unit, to obtain a first reference phase image;
(6) illuminating the object, via the first projector;
(7) capturing a first object image, via the processing unit;
(8) loading the object;
(9) illuminating the object via the second projector;
(10) capturing a second object image, via the processing unit;
(11) subtracting the first object image from the second object image, via the processing unit, to obtain a first object phase image; and
(12) subtracting the first object phase image from the first reference phase image, via the processing unit, to obtain a deformation image comprising the deformations of the object.

15. The method of claim 14, further comprising:
(1) determining a depth of focus of the camera, via a first positioning system coupled with the camera;

(2) moving the reference surface within the depth of focus in one or more increments, via a second positioning system coupled with the reference surface;

(3) capturing one or more calibration images of the reference surface corresponding to the one or more increments, via the processing unit;

(4) generating an x-correction function from the one or more calibration images, via the processing unit;

(5) generating a y-correction function from the one or more calibration images, via the processing unit; and (6) correcting the deformation image according to the x-correction and y-correction functions, via the processing unit, to obtain a corrected deformation image.

16. An optical system for determining contours of an object, comprising:

(1) a reference surface comprising an orthogonal grating;
(2) a first projector;
(3) a second projector;
(4) a camera; and
(5) a processing unit coupled with the camera and operative to receive video signals from the camera;

wherein:
(a) the reference surface is illuminated, via the first projector, and a first reference image is captured, via the processing unit;
(b) the reference surface is illuminated, via the second projector, and a second reference image is captured, via the processing unit;
(c) the first reference image is subtracted from the second reference image, via the processing unit, to obtain a first reference phase image;
(d) the object is illuminated, via the first projector, and a first object image is captured, via the processing unit;
(e) the object is illuminated, via the second projector, and a second object image is captured, via the processing unit;
(f) the first object image is subtracted from the second object image, via the processing unit, to obtain a first object phase image; and
(g) the first object phase image is subtracted from the first reference phase image, via the processing unit, to obtain a first contour image comprising the contours of the object.

17. The system of claim 16, further comprising:

(1) a third projector;
(2) a fourth projector;

wherein:
(a) the reference surface is illuminated, via the third projector, and a third reference image is captured, via the processing unit;
(b) the reference surface is illuminated, via the fourth projector, and a fourth reference image is captured, via the processing unit;
(c) the third reference image is subtracted from the fourth reference image, via the processing unit, to obtain a second reference phase image;
(d) the object is illuminated, via the third projector, and a third object image is captured, via the processing unit;
(e) the object is illuminated, via the fourth projector, and a fourth object image is captured, via the processing unit;
(f) the third object image is subtracted from the fourth object image, via the processing unit, to obtain a second object phase image;
(g) the second object phase image is subtracted from the second reference phase image, via the processing unit, to obtain a second contour image comprising the contours of the object.

18. The system of claim 17, wherein further a first and second moiré images are generated from the first and second contour images, via the processing unit.

19. The system of claim 17, further comprising:

(1) a first positioning system coupled with the camera; and
(2) a second positioning system coupled with the reference surface;

wherein:
(a) a depth of focus of the camera is determined, via the first positioning system;
(b) the reference surface is moved within the depth of focus in one or more increments, via the second positioning system, and one or more calibration images of the reference surface are captured, via the processing unit, corresponding to the one or more increments;
(c) an x-correction function is generated from the one or more calibration images, via the processing unit;
(d) a y-correction function is generated from the one or more calibration images, via the processing unit; and
(e) the first and second contour images are corrected according to the x-correction and y-correction functions, via the processing unit, to obtain a first and second corrected contour images.

20. The system of claim 19, wherein further a first and second corrected moiré images are generated from the first and second corrected contour images, via the processing unit.

21. An optical system for determining contours of an object wherein said object comprises a plurality of regions, said system comprising:

(1) a reference surface comprising an orthogonal grating;
(2) a first projector;
(3) a second projector;
(4) a camera; and
(5) a processing unit coupled with the camera and operative to receive video signals from the camera;

wherein:
(a) the reference surface is illuminated, via the first projector, and a first reference image is captured, via the processing unit;
(b) the reference surface is illuminated, via the second projector, and a second reference image is captured, via the processing unit;
(c) the first reference image is subtracted from the second reference image, via the processing unit, to obtain a first reference phase image;
(d) a first region of the plurality of regions is illuminated, via the first projector, and a first object image of the first region is captured, via the processing unit;
(e) the first region is illuminated, via the second projector, and a second object image of the first region is captured, via the processing unit;
(f) the first object image is subtracted from the second object image, via the processing unit, to obtain a first object phase image; and
(g) the first object phase image is subtracted from the first reference phase image, via the processing unit, to obtain a first contour image comprising the contours of the first region of the object.

22. The system of claim 21, further comprising:

(1) a first positioning system coupled with the camera; and
(2) a second positioning system coupled with the reference surface;

wherein:
(a) a depth of focus of the camera is determined, via the first positioning system;
(b) the reference surface is moved within the depth of focus in one or more increments, via the second positioning system, and one or more calibration images of the reference surface are captured, via the processing unit, corresponding to the one or more increments;
(c) an x-correction function is generated from the one or more calibration images, via the processing unit;
(d) a y-correction function is generated from the one or more calibration images, via the processing unit; and
(e) the first contour image is corrected according to the x-correction and y-correction functions, via the processing unit, to obtain a first corrected contour image.

23. The system of claim 22, wherein:
(a) the camera is moved relative to the object, via the first positioning system;
(b) a second region of the plurality of regions is illuminated, via the first projector, wherein the second region overlaps with the first region;
(c) a third object image of the second region is captured, via the processing unit;
(d) the second region is illuminated, via the second projector;
(e) a fourth object image of the second region is captured, via the processing unit;
(f) the third object image is subtracted from the fourth object image, via the processing unit, to obtain a second object phase image;
(g) the second object phase image is subtracted from the first reference phase image, via the processing unit, to obtain a second contour image comprising the contours of the second region of the object;
(h) the second contour image is corrected according to the x-correction and y-correction functions, via the processing unit, to obtain a second corrected contour image; and
(i) the first corrected contour image is matched with the second corrected contour image, via the processing unit, to obtain a matched second corrected contour image comprising the contours of the second region.

* * * * *